United States Patent
Berge et al.

(10) Patent No.: US 9,382,435 B2
(45) Date of Patent: *Jul. 5, 2016

(54) INKJET INKS CONTAINING CROSSLINKED POLYURETHANES

(75) Inventors: Charles T Berge, Earleville, MD (US); Xiaoqing Li, Newark, DE (US); Richard Douglas Bauer, Kennett Square, PA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 971 days.

This patent is subject to a terminal disclaimer.

(21) Appl. No.: 12/157,632

(22) Filed: Jun. 12, 2008

(65) Prior Publication Data

US 2008/0318009 A1    Dec. 25, 2008

Related U.S. Application Data

(63) Continuation of application No. 11/039,019, filed on Jan. 18, 2005, now abandoned.

(60) Provisional application No. 60/537,880, filed on Jan. 21, 2004.

(51) Int. Cl.
| | |
|---|---|
| *B41J 2/01* | (2006.01) |
| *B41J 2/21* | (2006.01) |
| *B41M 5/00* | (2006.01) |
| *C09D 11/30* | (2014.01) |
| *C09D 11/322* | (2014.01) |
| *C09D 11/326* | (2014.01) |
| *C09D 11/40* | (2014.01) |
| *D06P 5/30* | (2006.01) |

(52) U.S. Cl.
CPC . *C09D 11/30* (2013.01); *B41J 2/01* (2013.01); *B41J 2/21* (2013.01); *B41M 5/0023* (2013.01); *B41M 5/0047* (2013.01); *B41M 5/0088* (2013.01); *C09D 11/322* (2013.01); *C09D 11/326* (2013.01); *C09D 11/40* (2013.01); *D06P 5/30* (2013.01); *Y10T 428/24802* (2015.01)

(58) Field of Classification Search
CPC .... C09D 11/30; C09D 11/322; C09D 11/326; C09D 11/40; B41J 2/21; B41J 2/01; D06P 5/30; Y10T 428/24802; B41M 5/0023; B41M 5/0047; B41M 5/0088
USPC ............ 106/31.25, 31.6, 31.76, 31.85; 347/1, 347/86, 100; 358/502; 427/466; 523/160, 523/161; 524/591, 839, 840
See application file for complete search history.

(56) References Cited

U.S. PATENT DOCUMENTS

| | | | |
|---|---|---|---|
| 4,597,794 A | 7/1986 | Ohta et al. | |
| 5,679,141 A * | 10/1997 | McInerney et al. | 106/31.6 |
| 5,897,694 A | 4/1999 | Woolf | |
| 6,034,154 A * | 3/2000 | Kase et al. | 523/161 |
| 6,136,890 A | 10/2000 | Carlson et al. | |
| 6,146,769 A | 11/2000 | Anton | |
| 6,284,004 B1 * | 9/2001 | Burglin et al. | 8/466 |
| 2003/0105187 A1 | 6/2003 | Iijima | |
| 2003/0128246 A1 | 7/2003 | Redding et al. | |
| 2003/0160851 A1 | 8/2003 | Baccay et al. | |

FOREIGN PATENT DOCUMENTS

| | | |
|---|---|---|
| JP | 1996283636 A | 10/1996 |
| JP | 1997143407 A | 6/1997 |
| WO | WO03/029318 A1 | 4/2003 |
| WO | WO03/029362 A2 | 4/2003 |

* cited by examiner

*Primary Examiner* — Patrick Niland
(74) *Attorney, Agent, or Firm* — John H. Lamming; Simon L. Xu

(57) ABSTRACT

Inkjet inks are described that have, as a principal component, a crosslinked polyurethane dispersoid binder additive. These inks can be used for printing on different media, and are particularly suitable for printing on textiles.

22 Claims, No Drawings

INKJET INKS CONTAINING CROSSLINKED POLYURETHANES

CROSS-REFERENCE TO RELATED APPLICATIONS

This application claims priority under 35 U.S.C. §119 from U.S. Provisional Application Ser. No. 60/537,880 (filed Jan. 21, 2004), the disclosure of which is incorporated by reference herein for all purposes as if fully set forth.

This application is related to commonly owned U.S. application Ser. No. 11/039,019 concurrently filed herewith, entitled "Inkjet Inks Containing Crosslinked Polyurethanes", which also claims priority under 35 U.S.C. §119 from U.S. Provisional Application Ser. No. 60/537,880 (filed Jan. 21, 2004).

BACKGROUND OF THE INVENTION

This invention pertains to inkjet inks, more specifically to pigmented inkjet inks containing crosslinked polyurethane dispersoid binders, which are particularly suitable for textile printing.

Inkjet recording is a printing method wherein droplets of ink are ejected through fine nozzles to form letters or figures on the surface of recording media. Inks used in such recording are subject to rigorous demands including, for example, good dispersion stability, ejection stability, and good fixation to media.

Both dyes and pigments have been used as colorants for inkjet inks. While dyes typically offer superior color properties compared to pigments, they tend to fade quickly and are more prone to rub off. Inks comprising pigments dispersed in aqueous media are advantageously superior to inks using water-soluble dyes in water-fastness and light-fastness of printed images.

Pigments suitable for aqueous inkjet inks are in general well known in the art. Traditionally, pigments are stabilized by dispersing agents, such as polymeric dispersants or surfactants, to produce a stable dispersion of the pigment in the vehicle. Other additives to the ink modify the ink to match the needs for the target printed system, which includes the media.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost-effective short run production. Inkjet printing furthermore allows visual effects, such as tonal gradients and repeat of printed patterns, that cannot be practically achieved with a screen printing process. Especially in the case of the production of pattern originals it is possible to respond to a change in requirements within a significantly shorter period of time.

Suitable such digital printing systems for textiles are disclosed, for example, in commonly owned US20030128246 and US20030160851, the disclosures of which are incorporated by reference herein for all purposes as if fully set forth. Even as inkjet hardware improvements are made to increase printing speeds, adoption of inkjet printing in the textile industry will be impeded if methods to also improve colorfastness are not found.

U.S. Pat. No. 4,597,794 discloses inkjet ink formulations suitable for textile, with the ink formulation dispersion medium containing a polymer having both an ethylenically unsaturated carboxylic acid substituent as a hydrophilic portion and an aromatic ring substituent as a hydrophobic portion. Wash fastness was described as excellent for fabrics were imaged with this ink and set by heating at 150° C. for five minutes.

U.S. Pat. No. 5,897,694 discloses inkjet ink formulations comprising, as an additive, a transition metal chelate. These inks are said to provide improved wash fastness.

U.S. Pat. No. 5,958,561 discloses an ink/textile combination wherein the textile is pretreated with a crosslinkable thermoplastic polymer and then imaged with an aqueous ink and cured at temperatures of 100-190° C. Improved washfastness was reported.

U.S. Pat. No. 6,146,769 discloses an ink/textile combination wherein a water-soluble interactive polymer, in at least one of the inks or on the textile, is said to help bind the particulate colorant and provide wash fastness.

Japanese laid-open patent Hei 9-143407 discloses an inkjet ink with thermoset resin which is imaged on fabric and fixed by heating at 130° C. The image is said to be water resistant.

Japanese laid open patent Hei 8-283636 discloses an inkjet ink with specified resin emulsions having high Tg. Fabric imaged with this ink is fixed at elevated temperature to provide washfastness.

WO03/029362 discloses a pigmented inkjet ink suitable for textiles comprising an emulsion polymer and a crosslinking agent which is suitable for cross linking the emulsion polymer. The disclosure suggests that the use of the described crosslinking agent improves dry and wash fastness.

U.S. Pat. No. 6,034,154 discloses polymer fine particles, each polymer fine particle containing a colorant. One of the candidate polymers making up the polymer portion of the fine particle is described as a crosslinked polyurethane.

U.S. Pat. No. 6,136,890 describes pigmented inks that contain pigments and polyurethane dispersants that stabilize the pigments. The pigment is dispersed by the polyurethane via dispersing techniques used to achieve a stabile pigment dispersion.

US20030105187 describes a water-based pigmented ink for use in inkjet printing (on paper and transparencies media). The ink consists of a pigment and a latex, of which uncrosslinked polyurethanes are listed as candidate latexes.

WO03/029318 describes polyurethane block copolymers as dispersants for inks. These polyurethanes are crosslinked prior to inversion (addition of water to produce the polyurethane dispersion) not during or after inversion. There is also crosslinking derived from the added melamine crosslinker which is only effective at high temperatures and/or acidic conditions that occur at the time of the textile treatments after printing.

The disclosures of all of the above-identified publications are incorporated by reference for all purposes as if fully set forth.

A disadvantage of inkjet printing, in particular inkjet printing with pigmented ink, is inkjet printed fabrics are particularly susceptible to color removal by abrasion and thus have poor durability. Furthermore, another disadvantage of inkjet printing, in particular inkjet printing with pigmented ink is that inkjet printed fabrics do not tolerate washing conditions required for textiles. The printed colors both fade upon washing and during the wash the colors can be undesirably transferred to other fabrics in the wash or to the washing machine parts.

Still, there is need in the art for improved durability of inkjet images on textile, especially in cases where the colorant is pigment.

It is thus an object of this invention to provide inkjet printed textiles with improved durability and colorfastness especially as a result of laundering.

SUMMARY OF THE INVENTION

It was found that the washfastness and stain rating of an inkjet printed textile can be improved to a commercially acceptable level by using a crosslinked polyurethane dispersoid binder in aqueous inkjet inks. The instant invention is particularly advantageous for improving the durability of textiles printed with colorants in inkjet inks, and allows the achievement of commercially acceptable durability for inkjet ink printed textiles.

Thus, in one aspect of the present invention, there is provided an inkjet ink composition comprising an aqueous vehicle, a colorant and a crosslinked polyurethane dispersoid, wherein the colorant is soluble or dispersible in the aqueous vehicle, and wherein the weight ratio of the crosslinked polyurethane to colorant is at least about 1.0. The inkjet ink may optionally comprise other well-known additives or adjuvants as required to obtain final desired properties.

The colorant in the inkjet ink preferably ranges from about 0.1 to about 30 wt %, based on the total weight of the ink, and is preferably a pigment. The crosslinked polyurethane dispersoid is preferably more than about 1% by weight (solids basis), based on the total weight of the ink. The amount of crosslinking in the crosslinked polyurethane is preferably more than about 1%, as measured by the THF insolubles test discussed in further detail below.

In accordance with another aspect of the present invention, there is provided an inkjet ink set comprising at least three differently colored inkjet inks, wherein at least one of the inks is an inkjet ink as set forth above.

In yet another aspect of the present invention, there is provided a method for inkjet printing onto a substrate, comprising the steps of:

(a) providing an inkjet printer that is responsive to digital data signals;

(b) loading the printer with a substrate to be printed;

(c) loading the printer with an ink as set forth above and described in further detail below, or an inkjet ink set as set forth above and described in further detail below; and (d) printing onto the substrate using the ink or inkjet ink set in response to the digital data signals.

As indicated above, the inks and ink sets in accordance with the present invention are particularly useful as inkjet inks, more particularly as inkjet inks for textile printing. Preferred substrates, therefore, include textiles.

The printed textile can optionally be subject to a fusing process after printing. The fusing process requires exposing the printed textile to a combination of heat and pressure, which has been found to generally improve the durability of the textile, particularly when the colorant is a pigment. In particular, the post treatment combination of heat and pressure has been found to improve wash fastness and stain rating.

Another aspect of the present invention is an inkjet printed textile inkjet printed with a pigmented inkjet ink, said printed textile having a wash fastness of at least 2.0 and a stain rating of at least 3.0 (as measured in accordance with AATCC Test Method 61-1996 as the 2A test).

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

The aqueous inks comprise a colorant, a crosslinked polyurethane dispersoid binder and other ink components, wherein the colorant is soluble or dispersible in the aqueous vehicle.

In accordance with the present invention, the term "polyurethane dispersoid" refers to an aqueous dispersion/emulsion of a polymer containing urethane groups (e.g., polyurethane), as those terms are understood by persons of ordinary skill in the art. The aqueous crosslinked polyurethane dispersoid in accordance with the present invention comprises a crosslinked polyurethane, and thus is an aqueous stable polyurethane emulsion or dispersion in which the polyurethane contains some crosslinking. To distinguish the polyurethane dispersions/emulsion binders from the other dispersions and components in the inkjet ink, they are referred to herein as polyurethane "dispersoid(s)".

The crosslinked polyurethane dispersoid is combined with the aqueous vehicle and colorant to produce a stable inkjet ink that can be used to print textiles. The crosslinked polyurethane preferably has had substantially all of its crosslinking completed prior to its addition to the other inkjet ink components. The order of addition of the ink components can be in any convenient order.

Examples of polyurethanes that can be used in the crosslinked polyurethane dispersoids are described below. As indicated above, the crosslinking of the polyurethanes is preferably achieved prior to its addition to the ink system.

Colorants

Suitable colorants for the inks of this invention include soluble colorants such as dyes, and insoluble colorants such as dispersed pigments (pigment plus dispersing agent) and self-dispersing pigments.

Conventional dyes such as anionic, cationic, amphoteric and non-ionic dyes are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

Useful dyes include (cyan) Acid Blue 9 and Direct Blue 199; (magenta) Acid Red 52, Reactive Red 180, Acid Red 37, CI Reactive Red 23; and (yellow) Direct Yellow 86, Direct Yellow 132 and Acid Yellow 23.

Pigments suitable for used in the present invention are those generally well-known in the art for aqueous inkjet inks. Traditionally, pigments are stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants. Dispersed dyes are also considered pigments as they are insoluble in the aqueous inks used herein.

Pigments that are stabilized by added dispersing agents may be prepared by methods known in the art. It is generally desirable to make the stabilized pigment in a concentrated form. The stabilized pigment is first prepared by premixing the selected pigment(s) and polymeric dispersant(s) in an aqueous carrier medium (such as water and, optionally, a water-miscible solvent), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ, and nylon. These various dispersion processes are in a general sense well known in the art, as exemplified by U.S. Pat. No. 5,022,592, U.S. Pat. No. 5,026,427, U.S. Pat. No. 5,310,778, U.S. Pat. No. 5,891,231, U.S. Pat. No. 5,679,138, U.S. Pat. No. 5,976,232 and US20030089277. The disclosure of each of these publications is incorporated by reference herein for all purposes as if fully set forth. Preferred are 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

The dispersant used to stabilize the pigment is preferably a polymeric dispersant. Either structured or random polymers may be used, although structured polymers are preferred for use as dispersants for reasons well known in the art. The term "structured polymer" means polymers having a block, branched or graft structure. Examples of structured polymers include AB or BAB block copolymers such as disclosed in U.S. Pat. No. 5,085,698; ABC block copolymers such as disclosed in EP-A-0556649; and graft polymers such as disclosed in U.S. Pat. No. 5,231,131. Other polymeric dispersants that can be used are described, for example, in U.S. Pat. No. 6,117,921, U.S. Pat. No. 6,262,152, U.S. Pat. No. 6,306,994 and U.S. Pat. No. 6,433,117. The disclosure of each of these publications is incorporated herein by reference for all purposes as if fully set forth.

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth)acrylate may be employed.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in previously incorporated U.S. Pat. No. 5,085,698.

In the case of organic pigments, the ink may contain up to about 30%, preferably about 0.1 to about 25%, and more preferably about 0.25 to about 10%, pigment by weight based on the total ink weight. If an inorganic pigment is selected, the ink will tend to contain higher weight percentages of pigment than with comparable inks employing organic pigment, and may be as high as about 75% in some cases, since inorganic pigments generally have higher specific gravities than organic pigments.

Self-dispersed pigments (SDPs) can be use with the crosslinked polyurethane dispersoids and are often advantageous over traditional dispersant-stabilized pigments from the standpoint of greater stability and lower viscosity at the same pigment loading. This can provide greater formulation latitude in final ink.

SDPs, and particularly self-dispersing carbon black pigments, are disclosed in, for example, U.S. Pat. No. 2,439,442, U.S. Pat. No. 3,023,118, U.S. Pat. No. 3,279,935 and U.S. Pat. No. 3,347,632. Additional disclosures of SDPs, methods of making SDPs and/or aqueous inkjet inks formulated with SDP's can be found in, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No.

6,153,001, U.S. Pat. No. 6,221,141, U.S. Pat. No. 6,221,142, U.S. Pat. No. 6,221,143, U.S. Pat. No. 6,281,267, U.S. Pat. No. 6,329,446, US2001/0035110, EP-A-1114851, EP-A-1158030, WO01/10963, WO01/25340 and WO01/94476. The disclosures of all of the above-identified publications are incorporated by reference herein for all purposes as if fully set forth.

Polyurethane Dispersoid Binders (PUDs)

As indicated above, a crosslinked polyurethane dispersoid refers to an aqueous dispersion of a polymer containing urethane groups and crosslinking, as those terms are understood by persons of ordinary skill in the art. These polymers may also incorporate hydrophilic functionality to the extent required to maintain a stable dispersion of the polymer in water and, more preferably, the aqueous vehicle. The main advantage of incorporating hydrophilic functionality into the polymer is that dispersion can be performed with minimal energy so that the dispersing processes do not require strong shear forces, resulting in finer particle size, better dispersion stability, and reduced water sensitivity of the polymers obtained after evaporation of the water. These polymers may also incorporate ionic and nonionic functionality to the extent required to maintain a stable dispersion of the polymer in water. Alternatively, these polymers can be prepared by emulsification of hydrophobic polyurethanes in water with the aid of suitable external emulsifiers, surfactants and the like, and/or utilizing strong shear forces to form an oil-in-water dispersion.

In general, the stability of the crosslinked polyurethane in the aqueous vehicle is achieved by incorporating anionic, cationic and/or non-ionic components in the polyurethane polymer, which facilitates stabilizing the crosslinked polyurethane in aqueous systems. External emulsifiers may also be added to stabilize the polyurethane. Combinations of incorporated anionic, cationic and/or non-ionic components, and/or external emulsifiers can also be used.

Examples of suitable polyurethanes are those in which the polymer is predominantly stabilized in the dispersion through incorporated anionic functionality, and an example of this is anionic functionality such as neutralized acid groups ("anionically stabilized polyurethane dispersoid"). Further details are provided below. Further examples of hydrophilic functionalization are cationic and nonionic functionality.

Suitable aqueous polyurethane dispersoids are typically prepared by multi-step synthetic processes in which an NCO terminated prepolymer is formed, this prepolymer is added to water or water is added to the prepolymer forming a polymer dispersed in water (aqueous dispersion) and subsequently chain extended in the aqueous phase. The pre-polymer can be formed by a single or multi-step process. Chain extension, if used, can also be a single or multi-step process. The important crosslinking can occur as part of these single or multi-step processes.

After the polyurethane dispersoid is prepared it is included with the other ink components to produce the inkjet ink. The details of the preparation of the ink are familiar to those skilled in the art.

It is preferred that the crosslinking for the polyurethane is substantially completed prior to its addition to the ink formulation. Other uses of polyurethanes in inkjet system can require that there is a component in the polyurethane which undergoes crosslink at the time of the ink formulation, or more likely at the time of the printing, or post treatment of the printed material. Alternatively, a crosslinking species can be added to affect the crosslinking at the ink formulation time or later. Each of these processes can be described as a post-crosslinking system, As indicated above, the polyurethane dispersoid is typically prepared by a multiple step process. Typically, in the first stage of prepolymer formation, a diisocyanate is reacted with a compound, polymer, or mixtures of compound, mixture of polymers or a mixture thereof, each containing two NCO-reactive groups. An additional compound or compounds, all containing ≥2 NCO-reactive groups as well as a stabilizing ionic functionality, is also used to form an intermediate polymer. This intermediate polymer or pre-polymer can be terminated with either an NCO-group or a NCO-reactive group. The terminal groups are defined by the molar ratio of NCO to NCO-reactive groups in the prepolymer stage. Typically, the pre-polymer is an NCO-terminated material that is achieved by using a molar excess of NCO. Thus, the molar ratio of diisocyanate to compounds containing two isocyanate-reactive groups is at least about 1.1:1.0, preferably about 1.20:1.0 to about 5.0:1.0, and more preferably about 1.20:1.0 to about 2.5:1.0. In general, the ratios are achieved by preparing, in a first stage, an NCO-terminated intermediate by reacting one of the NCO-reactive compounds, having at least 2 NCO reactive groups, with all or part of the diisocyanate. This is followed, in sequence, by additions of other NCO-reactive compounds, if desired. When all reactions are complete the group, NCO and/or NCO-reactive groups will be found at the termini of the pre-polymer. These components are reacted in amounts sufficient to provide a molar ratio such that the overall equivalent ratio of NCO groups to NCO-reactive groups is achieved.

Suitable diisocyanates are those that contain either aromatic, cycloaliphatic or aliphatic groups bound to the isocyanate groups. Mixtures of these compounds may also be used. The preferred is a prepolymer that has isocyanates bound to a cycloaliphatic or aliphatic moieties. If aromatic diisocyanates are used, cycloaliphatic or aliphatic isocyanates are preferably present as well.

Examples of suitable diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)cyclohexane; 1-isocyanato-2-isocyanatomethyl cyclopentane; 2,4'-diisocyanatodicyclohexyl methane; bis-(4-isocyanato-3-methyl-cyclohexyl)-methane, alpha,alpha,alpha',alpha'-tetramethyl-1,3- and/or -1,4-xylene diisocyanate; 1-isocyanato-1-methyl-4(3)-isocyanatomethyl cyclohexane; and 2,4- and/or 2,6-hexahydrotoluoylene diisocyanate.

Additional diisocyanates may be linear or branched and contain 4 to 12 carbon atoms, preferably 4 to 9 carbon which include 1,4-tetramethylene diisocyanate; 1,6-hexamethylene diisocyanate; 2,2,4-trimethyl-1,6-hexamethylene diisocyanate; and 1,12-dodecamethylene diisocyanate. 1,6-hexamethylene diisocyanate and isophorone diisocyanate are examples of diisocyanates effective for the crosslinked polyurethanes Examples of non-ionic dispersing groups include, for example, a non-ionic dispersing segment present within the polyurethane which is solvent-soluble and that promotes dispersion of the polyurethane within a chosen solvent. When the chosen solvent comprises water, for example, a non-ionic dispersing segment can be a hydrophilic dispersing segment such as an alkylene oxide or polyoxyalkylene oxide segment, e.g., $-((CH_2)_nO)_m-$, wherein n can preferably be from 2 to 4, and m can be from about 1 to 400, preferably from about 5 to 200.

Isocyanate-reactive compounds containing ionic groups, for example anionic and cationic groups, can be chemically incorporated into the polyurethane to provide hydrophilicity and enable the polyurethane to be dispersed in an aqueous medium.

Examples of ionic dispersing groups include carboxylate groups (—COOM), phosphate groups (—OPO$_3$ M$_2$), phosphonate groups (—PO$_3$ M$_2$), sulfonate groups (—SO$_3$ M), quaternary ammonium groups (—NR$_3$Y, wherein Y is a monovalent anion such as chlorine or hydroxyl), or any other effective ionic group. M is a cation such as a monovalent metal ion (e.g., Na$^+$, K$^+$, Li$^+$, etc.), H$^+$, NR$_4$$^+$, and each R can be independently an alkyl, aralkyl, aryl, or hydrogen. These ionic dispersing groups are typically located pendant from the polyurethane backbone.

In the case of anionic group substitution, the groups can be carboxylic acid groups, carboxylate groups, sulphonic acid groups, sulphonate groups, phosphoric acid groups and phosphonate groups, The acid salts are formed by neutralizing the corresponding acid groups either prior to, during or after formation of the NCO prepolymer, preferably after formation of the NCO pre-polymer.

Suitable compounds for incorporating carboxyl groups are described in U.S. Pat. No. 3,479,310, U.S. Pat. No. 4,108,814 and U.S. Pat. No. 4,408,008, the disclosures of which are incorporated by reference herein for all purposes as if fully set forth. The neutralizing agents for converting the carboxylic acid groups to carboxylate salt groups are described in the preceding incorporated publications, and are also discussed hereinafter. Within the context of this invention, the term "neutralizing agents" is meant to embrace all types of agents that are useful for converting carboxylic acid groups to the more hydrophilic carboxylate salt groups. In like manner, sulphonic acid groups, sulphonate groups, phosphoric acid groups, and phosphonate groups can be neutralized with similar compounds to their more hydrophilic salt form.

Examples of carboxylic group-containing compounds are the hydroxy-carboxylic acids corresponding to the formula (HO)$_x$Q(COOH)$_y$, wherein Q represents a straight or branched, hydrocarbon radical containing 1 to 12 carbon atoms, x is 1 or 2 (preferably 2), and y is 1 to 3 (preferably 1 or 2).

Examples of these hydroxy-carboxylic acids include citric acid, tartaric acid and hydroxypivalic acid.

Especially preferred acids are those of the above-mentioned formula wherein x=2 and y=1. These dihydroxy alkanoic acids are described in U.S. Pat. No. 3,412,054, the disclosure of which is incorporated by reference herein for all purposes as if fully set forth. Especially preferred dihydroxy alkanoic acids are the alpha,alpha-dimethylol alkanoic acids represented by the structural formula:

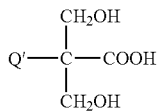

wherein Q' is hydrogen or an alkyl group containing 1 to 8 carbon atoms. The most preferred compound is alpha,alpha-dimethylol propionic acid, i.e., wherein Q' is methyl in the above formula.

When the ionic stabilizing groups are acids, the acid groups are incorporated in an amount sufficient to provide an acid group content, known by those skilled in the art as acid number (mg KOH per gram solid polymer), of at least about 5, preferably at least about 10 milligrams KOH per 1.0 gram of polyurethane. The upper limit for the acid number (AN) is about 50, preferably about 40.

Suitable polyols containing at least two NCO reactive groups, which may be reacted to prepare the prepolymer, are those having a molecular weight of about 60 to about 6000. Of these, the polymeric polyols are best defined by the number average molecular weight, and can range from about 200 to about 6000, preferably about 800 to about 3000, and more preferably about 1000 to about 2500. The molecular weights are determined by hydroxyl group analysis (OH number). Examples of these high molecular weight compounds include polyester, polyether, polycarbonates, polyacetals, poly(meth) acrylates, polyester amides, polythioethers or mixed polymers such as a polyester-polycarbonate where both ester and carbonate linkages are found in the same polymer. A combination of these polymers can also be used. For examples, a polyester polyol and a poly(meth)acrylate polyol may be used in the same polyurethane synthesis.

Similar NCO reactive materials can be used as described for hydroxy containing compounds and polymers, but which contain other NCO reactive groups. Examples would be dithiols, diamines, thioamines and even hydroxythiols and hydroxylamines. These can either be compounds or polymers with the molecular weights or number average molecular weights as described for the polyols.

Suitable polyester diols include reaction products of polyhydric, preferably dihydric alcohols to which trihydric alcohols may optionally be added, and polybasic (preferably dibasic) carboxylic acids. Instead of these polycarboxylic acids, the corresponding carboxylic acid anhydrides or polycarboxylic acid esters of lower alcohols or mixtures thereof may be used for preparing the polyesters.

The polycarboxylic acids may be aliphatic, cycloaliphatic, aromatic and/or heterocyclic or mixtures thereof and they may be substituted, for example, by halogen atoms, and/or unsaturated. The following are mentioned as examples: succinic acid; adipic acid; suberic acid; azelaic acid; sebacic acid; 1,12-dodecyldioic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate.

Suitable polyhydric alcohols include, e.g., ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine, trimethylol-propane, polyether diols such as polyethylene glycol, polypropylene glycol, polybutylene glycol or mixed monomer polyether glycols. The polyesters may also contain a portion of carboxyl end groups. Polyesters of lactones, for example, epsilon-caprolactone, or hydroxycarboxylic acids, for example, omegahydroxycaproic acid, may also be used.

Polycarbonates containing hydroxyl groups include those known, per se, such as the products obtained from the reaction of diols such as propanediol-(1,3), butanediol-(1,4) and/or hexanediol-(1,6), diethylene glycol, triethylene glycol or tetraethylene glycol, higher polyether diols with phosgene, diarylcarbonates such as diphenylcarbonate, dialkylcarbonates such as diethylcarbonate or with cyclic carbonates such as ethylene or propylene carbonate. Also suitable are polyester carbonates obtained from the above-mentioned polyesters or polylactones with phosgene, diaryl carbonates, dialkyl carbonates or cyclic carbonates.

Suitable polyether polyols are obtained in a known manner by the reaction of starting compounds that contain reactive hydrogen atoms with alkylene oxides such as ethylene oxide, propylene oxide, butylene oxide, styrene oxide, tetrahydrofuran, epichlorohydrin or mixtures of these. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- and 1,1,2-tris-(hydroxylphenyl)-ethane, dimethylolpropionic acid or dimethylolbutanoic acid.

Polyethers that have been obtained by the reaction of starting compounds containing amine compounds can also be used. Examples of these polyethers as well as suitable polyhydroxy polyacetals, polyhydroxy polyacrylates, polyhydroxy polyester amides, polyhydroxy polyamides and polyhydroxy polythioethers, are disclosed in U.S. Pat. No. 4,701,480 (the disclosure of which is incorporated by reference herein for all purposes as if fully set forth).

Poly(meth)acrylates containing hydroxyl groups include those common in the art of addition polymerization such as cationic, anionic and radical polymerization and the like. Examples are alpha-omega diols. An example of these type of diols are those which are prepared by a "living" or "control" or chain transfer polymerization processes which enables the placement of one hydroxyl group at or near the termini of the polymer. U.S. Pat. No. 6,248,839 and U.S. Pat. No. 5,990,245 (the disclosures of which are incorporated by reference herein for all purposes as if fully set forth) have examples of protocol for making terminal diols. Other di-NCO reactive poly(meth)acrylate terminal polymers can be used. An example would be end groups other than hydroxyl such as amino or thiol, and may also include mixed end groups with hydroxyl.

The high molecular weight polyols are generally present in the polyurethanes in an amount of at least about 5%, preferably at least about 10% by weight, based on the weight of the polyurethane. The maximum amount of these polyols is generally about 85%, and preferably about 75% by weight, based on the weight of the polyurethane.

Other optional compounds for preparing the NCO prepolymer include low molecular weight, at least difunctional NCO-reactive compounds having an average molecular weight of up to about 400. Examples include the dihydric and higher functionality alcohols, which have previously been described for the preparation of the polyester polyols and polyether polyols.

In addition to the above-mentioned components, which are preferably difunctional in the isocyanate polyaddition reaction, mono-functional and even small portions of tri-functional and higher functional components generally known in polyurethane chemistry, such as trimethylolpropane or 4-isocyanatomethyl-1,8-octamethylene diisocyanate, may be used in cases in which branching of the NCO prepolymer or polyurethane is desired. However, the NCO prepolymers should be substantially linear and this may be achieved by maintaining the average functionality of the prepolymer starting components at or below 2:1.

Other optional compounds include NCO-reactive compounds containing branched and/or terminal, hydrophilic and/or hydrophobic units. These units include non-ionic hydrophilic materials such as polyethylene oxides or copolymers with other oxide, and hydrophilic polyoxazolines. The content of hydrophilic units (when present) may be up to about 10%, preferably up to about 8% and most preferably about 2 to about 6%, by weight, based on the weight of the polyurethane. In addition, up to about 75% of the allowable, chemically incorporated, hydrophilic units may be replaced by known non-ionic, external emulsifiers. Examples of these are the alkaryl type polyoxyethylene, nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The isocyanate-reactive compounds for incorporating branched and/or terminal, hydrophilic and/or hydrophobic units may contain either one or two isocyanate-reactive groups, preferably hydroxy groups. Examples of these compounds are disclosed in U.S. Pat. No. 3,905,929, U.S. Pat. No. 3,920,598 and U.S. Pat. No. 4,190,566 (the disclosures of which are incorporated by reference herein for all purposes as if fully set forth). Preferred hydrophilic components are the monohydroxy polyethers or monohydroxyl oxazolines. These hydrophilic components may be produced as described in the preceding patents by alkoxylating a mono-functional starter, such as methanol or n-butanol, using ethylene oxide and optionally another alkylene oxide, such as propylene oxide or in the case of oxazolines, methyloxazoline.

Other optional compounds include isocyanate-reactive compounds containing self-condensing moieties. The content of these compounds are dependent upon the desired level of self-condensation necessary to provide the desirable resin properties. 3-amino-1-triethoxysilyl-propane is an example of a compound that will react with isocyanates through the amino group and yet self-condense through the silyl group when inverted into water.

Other optional compounds include isocyanate-reactive compounds containing non-condensable silanes and/or fluorocarbons with isocyanate reactive groups, which can be used in place of or in conjunction with the isocyanate-reactive compounds. U.S. Pat. No. 5,760,123 and U.S. Pat. No. 6,046,295 (the disclosures of which are incorporated by reference herein for all purposes as if fully set forth) list examples of methods for use of these optional silane/fluoro-containing compounds.

Process conditions for preparing the NCO containing prepolymers have been discussed in the publications previously noted. The finished NCO containing prepolymer should have a isocyanate content of about 1 to about 20%, preferably about 1 to about 10% by weight, based on the weight of prepolymer solids.

Mixtures of compounds and/or polymers having mixed NCO reactive groups are also possible.

The polyurethanes are typical prepared by chain extending these NCO containing prepolymers. Chain extenders are polyamine chain extenders, which can optionally be partially or wholly blocked as disclosed in U.S. Pat. No. 4,269,748 and U.S. Pat. No. 4,829,122 (the disclosures of which are incorporated by reference herein for all purposes as if fully set forth). These publications disclose the preparation of aqueous polyurethane dispersoids by mixing NCO-containing prepolymers with at least partially blocked, diamine or hydrazine chain extenders in the absence of water and then adding the mixture to water. Upon contact with water the blocking agent is released and the resulting unblocked polyamine reacts with the NCO containing prepolymer to form the polyurethane.

Suitable blocked amines and hydrazines include the reaction products of polyamines with ketones and aldehydes to form ketimines and aldimines, and the reaction of hydrazine with ketones and aldehydes to form ketazines, aldazines, ketone hydrazones and aldehyde hydrazones. The at least partially blocked polyamines contain at most one primary or secondary amino group and at least one blocked primary or secondary amino group which releases a free primary or secondary amino group in the presence of water.

Suitable polyamines for preparing the at least partially blocked polyamines have an average functionality, i.e., the number of amine nitrogens per molecule, of 2 to 6, preferably 2 to 4 and more preferably 2 to 3. The desired functionalities can be obtained by using mixtures of polyamines containing primary or secondary amino groups. The polyamines are generally aromatic, aliphatic or alicyclic amines and contain between 1 to 30, preferably 2 to 15 and more preferably 2 to 10 carbon atoms. These polyamines may contain additional substituents provided that they are not as reactive with isocyanate groups as the primary or secondary amines. These same polyamines can be partially or wholly blocked polyamines.

A suitable method of chain extension is to add polyamine to the NCO-prepolymer before, during or after the pre-polymer inversion into water. Optionally, the chain extension can occur after pre-polymer inversion. The polyamines include 1-amino-3-aminomethyl-3,5,5-trimethylcyclohexane (isophorone diamine or IPDA), bis-(4-aminocyclohexyl)-methane, bis-(4-amino-3-methylcyclohexyl)-methane, 1,6-diaminohexane, hydrazine, ethylene diamine, diethylene triamine, triethylene tetramine, tetraethylene pentamine and pentamethylene hexamine.

In some cases, chain termination may be desirable. This requires the addition, in most cases, of a mono-NCO reactive material such as a mono-amine or mono-alcohol. The materials can be added before, during or after inversion of the pre-polymer. Poly-NCO reactive materials can be used where one of the NCO-reactive groups reacts substantially faster than the others. Examples would be ethanol amine and diethanol amine. The amine group will react much faster with the NCO group than the alcohol.

Suitable chain terminators would be amines or alcohols having an average functionality per molecule of 1, i.e., the number of primary or secondary amine nitrogens or alcohol oxygens would average 1 per molecule. The desired functionalities can be obtained by using primary or secondary amino groups. The amines or alcohols are generally aromatic, aliphatic or alicyclic and contain between 1 to 30, preferably 2 to 15 and more preferably 2 to 10 carbon atoms. These may contain additional substituents provided that they are not as reactive with isocyanate groups as the amine or alcohol groups.

Chain terminators and chain extenders can be used together, either as mixtures or as sequential additions to the NCO-prepolymer.

The amount of chain extender and/or chain terminator to be used in accordance with the present invention is dependent upon the number of isocyanate groups in the prepolymer. Preferably, the ratio of isocyanate groups of the prepolymer to isocyanate-reactive groups of the chain extender/terminator is between about 1.0:0.6 and about 1.0:1.1, more preferably between about 1.0:0.7 and about 1.0:1.1, on an equivalent basis. Any isocyanate groups that are not chain extended/terminated with an amine or alcohol will react with water, which functions as a chain extender.

Chain extension can take place prior to addition of water in the process, but typically takes place by combining the NCO containing prepolymer, chain extender, water and other optional components under agitation.

In order to have a stable dispersion, a sufficient amount of the ionic groups (if present) must be neutralized so that, when combined with the optional hydrophilic ethylene oxide and other alkenyl oxide units and optional external emulsifiers, the resulting polyurethane will remain stably dispersed in the aqueous medium. Generally, at least about 70%, preferably at least about 80%, of the acid groups are neutralized to the corresponding carboxylate salt groups. Alternatively, cationic groups in the polyurethane can be quaternary ammonium groups ($-NR_3Y$, wherein Y is a monovalent anion such as chlorine or hydroxyl).

Suitable neutralizing agents for converting the acid groups to salt groups include tertiary amines, alkali metal cations and ammonia. Examples of these neutralizing agents are disclosed in previously incorporated U.S. Pat. No. 4,701,480, as well as U.S. Pat. No. 4,501,852 (the disclosure of which is incorporated by reference herein for all purposes as if fully set forth). Preferred neutralizing agents are the trialkyl-substituted tertiary amines, such as triethyl amine, tripropyl amine, dimethylcyclohexyl amine, and dimethylethyl amine. Substituted amines are also useful neutralizing groups such as diethyl ethanol amine or diethanol methyl amine.

Neutralization may take place at any point in the process. Typical procedures include at least some neutralization of the prepolymer, which is then chain extended/terminated in water in the presence of additional neutralizing agent.

The final product is a stable aqueous dispersoid of polyurethane particles having a solids content of up to about 60% by weight, preferably about 15 to about 60% by weight and most preferably about 30 to about 40% by weight. However, it is always possible to dilute the dispersions to any minimum solids content desired.

The means to achieve the crosslinking of the polyurethane generally relies on at least one component of the polyurethane (starting material and/or intermediate) having 3 or more functional reaction sites. Reaction of each of the 3 (or more) reaction sites will produce a crosslinked polyurethane (3-dimensional matrix). When only two reactive sites are available on each reactive components, only linear (albeit possibly high molecular weight) polyurethanes can be produced. Examples of crosslinking techniques include but are not limited to the following:

the isocyanate-reactive moiety has at least 3 reactive groups, for example polyfunctional amines or polyol;

the isocyanate has at least 3 isocyanate groups;

the prepolymer chain has at least 3 reactive sites that can react via reactions other than the isocyanate reaction, for example with amino trialkoxysilanes;

addition of a reactive component with at least 3 reactive sites to the polyurethane prior to its use in the inkjet ink preparations, for example tri-functional epoxy crosslinkers;

addition of a water-dispersible crosslinker with oxazoline functionality;

synthesis of a polyurethane with carbonyl functionality, followed by addition of a dihydrazide compound;

and any combination of the these crosslinking methods and other crosslinking means known to those of ordinary skill in the relevant art.

Also, it is understood that these crosslinking components may only be a (small) fraction of the total reactive functionality added to the polyurethane. For example, when polyfunctional amines are added, mono- and difunctional amines may also be present for reaction with the isocyanates. The polyfunctional amine may be a minor portion of the amines.

The crosslinking preferably occurs during the preparation of the polyurethane. A preferred time for the crosslinking in the polyurethane reaction sequence would be at or after the time of the inversion step. That is, crosslinking preferably occurs during the addition of water to the polyurethane preparation mixture or shortly thereafter. The inversion is that point where sufficient water is added such that the polyurethane is converted to its stable dispersed aqueous form. Most preferred is that the crosslinking occurs after the inversion. Furthermore, substantially all of the crosslinking of the polyurethane is preferably complete prior to its incorporation into the ink formulation.

Alternatively, the crosslinking can occur during the initial formation of the urethane bonds when the isocyanates or isocyanate-reactive groups have 3 or more groups capable of reacting. If the crosslinking is done at this early stage, the extent of crosslinking must not lead to gel formation. Too much crosslinking at this stage will prevent the formation of a stable polyurethane dispersion.

The amount of crosslinking of the polyurethane to achieve the desired inkjet ink for textiles can vary over a broad range. While not being bound to theory, the amount of crosslinking is a function of the polyurethane composition, the whole sequence of reaction conditions utilized to form the polyurethane and other factors known to those of ordinary skill in the art. The extent of crosslinking, the inkjet ink formulation, the colorant, other inks in the inkjet set, the textile, the post treatment exposure to heat and/or pressure, and the printing technique for the textile, all contribute to the final printed textile performance. For the printing technique this can include pre and post treatment of the textile.

Based on techniques described herein, a person of ordinary skilled in the art is able to determine, via routine experimentation, the crosslinking needed for a particularly type of polyurethane to obtain an effective inkjet ink for textiles. Furthermore, as indicated above, these inks may also be used for plain paper, photo paper, transparencies, vinyl and other printable substrates.

The amount of crosslinking can be measured by a standard tetrahydrofuran insolubles test. For the purposes of definition herein, the tetrahydrofuran (THF) insolubles of the polyurethane dispersoid is measured by mixing 1 gram of the polyurethane dispersoid with 30 grams of THF in a pre-weighed centrifuge tube. After the solution is centrifuged for 2 hours at 17,000 rpm, the top liquid layer is poured out and the non-dissolved gel in the bottom is left. The centrifuge tube with the non-dissolved gel is re-weighed after the tube is put in the oven and dried for 2 hours at 110° C.

% THF insolubles of polyurethane=(weight of tube and non-dissolved gel−weight of tube)/(sample weight*polyurethane solid %)

The upper limit of crosslinking is related to the ability to make a stable aqueous polyurethane dispersion. If a highly crosslinked polyurethane has adequate ionic or non-ionic functionality such that it is a stable when inverted into water, then its level of crosslinking will lead to an improved inkjet ink for textiles. The emulsion/dispersion stability of the crosslinked polyurethane can be improved by added dispersants or emulsifiers. The upper limit of crosslinking as measured by the THF insolubles test is about 90%. Alternatively the upper limit is about 60%.

The lower limit of crosslinking in the polyurethane dispersoid is about 1% or greater, preferably about 4% or greater, and more preferably about 10% or greater, as measured by the THF insolubles test.

An alternative way to achieve an effective amount of crosslinking in the polyurethane is to choose a polyurethane that has crosslinkable sites, then crosslink those sites via self-crosslinking and/or added crosslinking agents. Examples of self-crosslinking functionality includes, for example, silyl functionality (self-condensing) available from certain starting materials as indicated above, as well as combinations of reactive functionalities incorporated into the polyurethanes, such as epoxy/hydroxyl, epoxy/acid and isocyanate/hydroxyl. Examples of polyurethanes and complementary crosslinking agents include: (1) a polyurethane with isocyanate reactive sites (such as hydroxyl and/or amine groups) and an isocyanate crosslinking reactant, and 2) a polyurethane with unreacted isocyanate groups and an isocyanate-reactive crosslinking reactant (containing, for example, hydroxyl and/or amine groups). The complementary reactant can be added to the polyurethane, such that crosslinking can be done prior to its incorporation into an ink formulation. The crosslinking should preferably be substantially completed prior to the incorporation of the dispersoid into the ink formulation. This crosslinked polyurethane preferably has from about 1% to about 90% crosslinking as measured by the THF insolubles test.

Combinations of two or more polyurethane crosslinked dispersoid binders may also be utilized in the formulation of the ink.

The crosslinked polyurethane dispersoid can be mixed with other binders, including latexes, and the like. A non-limiting list of these binders includes dispersed acrylics, neoprenes, dispersed nylons, and non-crosslinked polyurethanes dispersions (as defined herein by the THF insolubles test).

The term "latex" as used herein refers to a polymer particle that is dispersed in the vehicle. A latex is sometimes referred to as an "emulsion polymer". A latex is stabilized to dispersion by stabilizers which can be part of the polymer itself (internal stabilizers) or separate species (external stabilizers) such as emulsifiers.

Commercially available latexes have a median particle size in the range of about 0.02 to about 3 microns. For the present invention, the median particle size should preferably be less than about 1 micron, more preferably less than about 0.5 microns, and most preferably in the range of about 0.03 to about 0.3 microns.

Polymer synthesis for these latexes can be performed under emulsion polymerization conditions with standard free radical initiators, chain transfer initiators and surfactants. Chain transfer agents such as dodecyl mercaptan and sulfur are used to control the molecular weight, branching, and gel content. Molecular weight is typically in the range of about 100,000 to over about 1,000,000 Dalton. The percent conversion is also controlled to limit the gel content.

Aqueous Vehicle

"Aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in previously incorporated U.S. Pat. No. 5,085,698.

The aqueous inks of the present invention are comprised primarily of water. Thus, the instant inks comprise at least about 40%, preferably at least about 45%, and more preferably at least about 50% by weight of water, based on the total weight of the ink.

If a mixture of water and a water-soluble solvent is used, the aqueous vehicle typically will contain about 40% to about 95% by weight water with the balance (i.e., about 60% to about 5% by weight) being the water-soluble solvent. Preferred compositions contain about 65% to about 95% by weight water, based on the total weight of the aqueous vehicle.

The amount of aqueous vehicle in the ink is typically in the range of about 70% to about 99.8%, and preferably about 80% to about 99.8%, by weight based on total weight of the ink.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-alkanediols are preferably 1,2-$C_{4-6}$ alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, Pluronic® block copolymer surfactants, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink.

Surfactants may be used, typically in the amount of about 0.01 to about 5% and preferably about 0.1 to about 1%, based on the total weight of the ink.

In addition, solvents that are not water miscible may be added to the ink to facilitate the printing the ink which has a polyurethane dispersoid binder in it. While not being bound by theory, it is believed that this added non-aqueous solvent assists in the coalescence of the polyurethane onto the printed substrate, especially a fabric in the case of textile printing. Examples of these water-immiscible solvents are propylene carbonate and dipropylene glycol monomethyl ether.

Proportion of Main Ingredients

The pigment levels employed in the textile inks are those levels which are typically needed to impart the desired color density to the printed image. Typically, pigment is present at a level of about 0.1% up to a level of about 30% by weight of the total weight of ink. Alternatively, the pigment can be about 0.25 to about 25% of the total weight of the ink. Further, the pigment can be about 0.25 to about 15% of the total weight of the ink.

The crosslinked polyurethane dispersoid level employed is dictated by the range of ink properties that can be tolerated. Generally, polyurethane levels will range up to about 30%, more particularly from about 1% up to about 25%, and typically about 4% to about 20%, by weight (polyurethane solids basis) of the total weight of ink.

Effective levels of polyurethane are typically those where the weight ratio of polyurethane (solids) to colorant (pigment) is at least about 1.0, preferably more than about 1.0, alternatively more than about 1.33 and even further more than about 1.5. This weight ratio must be balanced against other ink properties, such as viscosity, to maintain acceptable jetting performance. The right balance of properties must be determined for each circumstance, which can be done by the person of ordinary skill in the art using routine experimentation.

Other Ingredients

The inkjet ink may contain other ingredients as are well known in the art. For example, anionic, nonionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 (incorporated by reference herein for all purposes as if fully set forth) may be included to improve pluggage inhibition properties of the ink composition.

Biocides may be used to inhibit growth of microorganisms.

Sequestering agents such as EDTA may also be included to eliminate deleterious effects of heavy metal impurities.

Ink Properties

Jet velocity, separation length of the droplets, drop size and stream stability are greatly affected by the surface tension and the viscosity of the ink. Inkjet inks suitable for use with inkjet printing systems should have a surface tension in the range of about 20 dyne/cm to about 70 dyne/cm, more preferably about 25 to about 40 dyne/cm at 25° C. Viscosity is preferably in the range of about 1 cP to about 30 cP, more preferably about 2 to about 20 cP at 25° C. The ink has physical properties compatible with a wide range of ejecting conditions, i.e., driving frequency of the pen and the shape and size of the nozzle.

The inks should have excellent storage stability for long periods. Preferably, the instant inks can sustain elevated temperature in a closed container for extended periods (e.g. 70° C. for 7 days) without substantial increase in viscosity or particle size.

Further, the ink should not corrode parts of the inkjet printing device it comes in contact with, and it should be essentially odorless and non-toxic.

Inks of the instant invention can achieve the beneficial durable properties of washfastness.

Ink Sets

The ink sets in accordance with the present invention preferably comprise at least three differently colored inks (such as CMY), and preferably at least four differently colored inks (such as CMYK), wherein at least one of the inks is an aqueous inkjet ink comprising an aqueous vehicle, a colorant and a crosslinked polyurethane dispersoid, wherein the colorant is soluble or dispersible in the aqueous vehicle, and wherein the weight ratio of polyurethane dispersoid to colorant is at least about 1.0, as set forth above.

The other inks of the ink set are preferably also aqueous inks, and may contain dyes, pigments or combinations thereof as the colorant. Such other inks are, in a general sense, well known to those of ordinary skill in the art.

In one preferred embodiment, the ink set comprises three differently colored inks as follows:

(a) a first colored ink comprising a first aqueous vehicle, a first colorant and a first crosslinked polyurethane dispersoid, wherein the first colorant is soluble or dispersible in the first aqueous vehicle, and wherein the weight ratio of the first polyurethane dispersoid to first colorant is at least about 1.0;

(b) a second colored ink comprising a second aqueous vehicle, a second colorant and a second crosslinked polyurethane dispersoid, wherein the second colorant is soluble or dispersible in the second aqueous vehicle, and wherein the weight ratio of the second polyurethane dispersoid to second colorant is at least about 1.0; and (c) a third colored ink comprising a third aqueous vehicle, a third colorant and a third crosslinked polyurethane dispersoid, wherein the third colorant is soluble or dispersible in the third aqueous vehicle, and wherein the weight ratio of the third polyurethane dispersoid to third colorant is at least about 1.0.

Preferably, the first colored ink is a cyan ink, the second colored ink is a magenta ink and the third colored ink is a yellow ink.

In another preferred embodiment, this ink set further comprises (d) a fourth colored ink comprising a fourth aqueous vehicle, a fourth colorant and a fourth crosslinked polyurethane dispersoid, wherein the fourth colorant is soluble or dispersible in the fourth aqueous vehicle, and wherein the weight ratio of the fourth polyurethane dispersoid to fourth colorant is at least about 1.0. Preferably this fourth colored ink is a black ink.

The ink set may further comprise one or more "gamut-expanding" inks, including different colored inks such as an orange ink, a green ink, a red ink and/or a blue ink, and combinations of full strength and light strengths inks such as light cyan and light magenta. These "gamut-expanding" inks are particularly useful in textile printing for simulating the color gamut of analog screen printing, such as disclosed in previously incorporated US20030128246.

Method of Printing

The inks and ink sets of the present invention can be by printing with any inkjet printer. The substrate can be any suitable substrate including plain paper (such as standard electrophotographic papers), treated paper (such as coated papers like photographic papers), textile, and non-porous substrates including polymeric films such as polyvinyl chloride and polyester.

A particularly preferred use of the inks and ink sets of the present invention is in the inkjet printing of textiles. Textiles include but are not limited to cotton, wool, silk, nylon, polyester and the like, and blends thereof. The finished form of the textile includes, but is not limited to, fabrics, garments, furnishings such as carpets and upholstery fabrics, and the like. Additionally, fibrous textile materials that come into consideration are especially hydroxyl-group-containing fibrous materials, including but not limited to natural fibrous materials such as cotton, linen and hemp, and regenerated fibrous materials such as viscose and lyocell. Particularly preferred textiles include viscose and especially cotton. Further fibrous materials include wool, silk, polyvinyl, polyacrylonitrile, polyamide, aramide, polypropylene and polyurethane. The said fibrous materials are preferably in the form of sheet-form textile woven fabrics, knitted fabrics or webs.

Suitable commercially available inkjet printers designed for textile printing include, for example, DuPont® Artistri® 2020 and 3210 Textile Printers (E.I. du Pont de Nemours and Company, Wilmington, Del.), Textile Jet (Mimaki USA, Duluth, Ga.), DisplayMaker Fabrijet (MacDermid Color Span, Eden Prairie, Minn.), Amber, Zircon, and Amethyst (Stork®).

The printed textiles may optionally be post processed with heat and/or pressure, such as disclosed in previously incorporated US20030160851.

Upper temperature is dictated by the tolerance of the particular textile being printed. Lower temperature is determined by the amount of heat needed to achieve the desired level of durability. Generally, fusion temperatures will be at least about 80° C. and preferably at least about 140° C., more preferably at least about 160° C. and most preferably at least about 180° C.

Fusion pressures required to achieve improved durability can be very modest. Thus, pressures can be about 3 psig, preferably at least about 5 psig, more preferable at least about 8 psig and most preferably at least about 10 psig. Fusion pressures of about 30 psi and above seem to provide no additional benefit to durability, but such pressures are not excluded.

The duration of fusion (amount of time the printed textile is under pressure at the desired temperature) is not believed to be particularly critical. Most of the time in the fusion operation generally involves bringing the print up to the desired temperature. Once the print is fully up to temperature, the time under pressure can be brief (seconds).

This invention now will be further illustrated, but not limited, by the following examples.

EXAMPLES

Tests used to characterize the polyurethane dispersoids, the inks and the printed textiles were those commonly used in the art. Some specific procedures are listed Printing and Testing Techniques Inkjet printers used in the following examples were:

(1) a print system with a stationery print head mount with up to 8 print heads, and a media platen. The printheads were from Xaar (Cambridge, United Kingdom). The media platen held the applicable media and traveled underneath the print heads. The sample size was 7.6 cm by 19 cm. Unless otherwise noted this print system was used to print the test samples.

(2) Seiko IP-4010 printer configured to accept fabrics (3) DuPont® Artistri® 2020 printer.

The fabrics used were obtained from Testfabrics, Inc, (Pittston Pa.) namely: (1) 100% cotton fabric style #419W, which is a bleached, mercerized combed broadcloth (133× 72); (2) Polyester/cotton fabric style #7435M, which is a 65/35 poplin mercerized and bleached; and (3) Polyester fabric style # XXXX, which is a 65/35 poplin mercerized and bleached.

In some examples, the printed textile was fused at elevated temperature and pressure. Two different fusing apparatus were employed:

(1) a Glenro (Paterson, N.J.) Bondtex™ Fabric and Apparel Fusing Press which moves the printed fabric between two heated belts equipped with adjustable pneumatic press and finally through a nip roller assembly; and (2) a platen press, assembled for the purpose of precisely controlling temperature and pressure. The platen press was comprised of two parallel 6" square platens with embedded resistive heating elements that could be set to maintain a desired platen temperature. The platens were fixed in a mutually parallel position to a pneumatic press that could press the platens together at a desired pressure by means of adjustable air pressure. Care was taken to be sure the platens were aligned so as to apply equal pressure across the entire work piece being fused. The effective area of the platen could be reduced, as needed, by inserting a spacer (made, for example from silicone rubber) of appropriate dimensions to allow operation on smaller work pieces.

The standard temperature for the fusing step in the examples was 160° C. unless otherwise indicated.

The printed textiles were tested according to methods developed by the American Association of Textile Chemists and Colorists, (AATCC), Research Triangle Park, N.C. The AATCC Test Method 61-1996, "Colorfastness to Laundering, Home and Commercial: Accelerated", was used. In that test, colorfastness is described as "the resistance of a material to change in any of its color characteristics, to transfer of its colorant(s) to adjacent materials or both as a result of the exposure of the material to any environment that might be encountered during the processing, testing, storage or use of the material." Tests 2A and 3A were done and the color washfastness and stain rating were recorded. The ratings for these tests are from 1-5 with 5 being the best result, that is, little or no loss of color and little or no transfer of color to another material, respectively.

The colorant dispersion, or other stable aqueous colorant, was prepared by techniques known in the inkjet art. A black pigment dispersion was used for the ink examples except where noted.

Ingredients and Abbreviations
  APTES=aminopropyltriethoxysilane
  APTMS=aminopropyltrimethoxy silane
  BZMA=benzyl methacrylate
  CHBMA=1,3-cyclohexane bis(methyl amine)
  DBTL=dibutyltindilaurate
  DMEA=dimethylethanolamine
  DMIPA=dimethylisopropylamine
  DMPA=dimethylol propionic acid
  EDA=ethylene diamine
  EDTA=ethylenediamine tetraacetic acid
  ETEGMA=ethoxytriethylenglycolmethacrylate
  HDI=1,6-hexamethylene diisocyanate
  IPDA=isophoronediamine
  IPDI=isophoronediisocyanate
  MAA=methyl acrylic acid
  NMP=n-Methyl pyrolidone
  POEA=2-phenoxyethyl acrylate ester
  TEA=triethylamine
  TEOA=triethanolamine
  TETA=triethylenetetramine
  THF=tetrahydrofuran Unless otherwise noted, the above chemicals were obtained from Aldrich (Milwaukee, Wis.) or other similar suppliers of laboratory chemicals.

BYK® 348—a silicone surfactant from Byk-Chemie (Wallingford, Conn.)

Cythane® 3174—an aliphatic polyisocyanate resin from Cytec (West Patterson, N.J.)

Desmodur N3400, a hexamethylene diisocyanate 40 wt % dimer and 60 wt % trimer blend from Bayer (Pittsburgh, Pa.)

Desmophene C 200—a polyester carbonate diol from Bayer (Pittsburgh, Pa.)

GP426—a 2000 molecular weight silicone based diol from Genesee Silicones, (Flint, Mich.)

Liponic™ EG-1—ethoxylated glycerin humectant from Lipo Chemicals Inc. (Patterson, N.J.)

Silwet® L77—an organosilicone surfactant from GE Silicones (Wilton, Conn.)

Surfynol® 104E—a nonionic surfactant from Air Products (Allentown, Pa.)

Surfynol® 485E—a nonionic surfactant from Air Products (Allentown, Pa.)

Surfynol® 440—a nonionic surfactant from Air Products (Allentown, Pa.)

Terathane® 1400—a polytetramethylene oxide polyol from E.I. du Pont de Nemours and Company (Wilmington, Del.)

Extent of Polyurethane Reaction

The extent of polyurethane reaction was determined by detecting NCO % by dibutylamine titration, a common method in urethane chemistry.

In this method, a sample of the NCO containing prepolymer is reacted with a known amount of dibutylamine solution and the residual amine is back titrated with HCl.

Particle Size Measurements

The particle size for the polyurethane dispersions, pigments and the inks were determined by dynamic light scattering using a Microtrac® UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

The reported numbers below are the volume average particle size.

Solid Content Measurement

Solid content for the solvent free polyurethane dispersoids was measured with a moisture analyzer, model MA50 from Sartorius. For polyurethane dispersoid containing high boiling solvent, such as NMP, the solid content was then determined by the weight differences before and after baking in 150° C. oven for 180 minutes THF Insolubles Measurement THF insolubles content of the polyurethanes was measured by first mixing 1 gram of the polyurethane dispersoid with 30 grams of THF in a pre-weighed centrifuge tube. After the solution was centrifuged for 2 hours at 17,000 rpm, the top liquid layer was poured out and the non-dissolved gel in the bottom was left. The centrifuge tube with the non-dissolved gel was re-weighed after the tube was put in the oven and dried for 2 hours at 110° C.

% Micro-gel of polyurethane=((weight of tube and non-dissolved gel)−(weight of tube))/(sample weight*polyurethane solid %).

Preparation of Inks

Inks used in the examples were made according to standard procedures in the inkjet art. Ingredient amounts are in weight percent of the final ink. Polyurethane dispersoid binders and colorants are quoted on a solids basis.

As an example of ink preparation, the ink vehicle was prepared and added with stirring to the polyurethane dispersoid binders. After stirring until a good dispersion was obtained, the mixture was then added to the pigment dispersion and stirred for another 3 hours, or until a good ink dispersion was obtained.

Preparation of Black Pigment Dispersion

A black dispersion was prepared by first mixing well the following ingredients: (i) 210.4 parts by weight (pbw) deionized water, (ii) 80.3 pbw of a 41.5 wt % (solids) anionic polymeric dispersant, and (iii) 9.24 pbw of dimethylethanolamine. The anionic polymer dispersant was a graft co-polymer 66.31-g-4.2/29.5 POEA/-g-ETEGMA/MAA prepared according to "Preparation of Dispersant 1" from previously incorporated US20030128246, with the ratios of monomers adjusted to obtain the 66.2/4.2/29.5 instead of the 61.6/5.8/32.6 ratio indicated in the publication.

To this was gradually added 100 pbw black pigment (Nipex 180IQ, Degussa). After the pigment was incorporated, 100 pbw deionized water was mixed in to form the mill-base, which was circulated through a media mill for grinding. 55.4 pbw deionized water was then added for dilution to final strength.

The resulting 15 wt % dispersion had the following properties: a viscosity of 8.60 cP (Brookfield viscometer, 20° C.), a pH of about 7.5 and a median particle size of 92 nm.

Comparative Polyurethane Dispersoid 1 (Comp. PUD 1)

To a dry, alkali- and acid-free flask, equipped with an addition funnel, a condenser, stirrer and a nitrogen gas line, was added 699.2 g Desmophene C 200, 280.0 g acetone and 0.06 g DBTL. The contents were heated to 40° C. and mixed well. 189.14 g IPDI was then added to the flask via the addition funnel at 40° C. over 60 min, with any residual IPDI being rinsed from the addition funnel into the flask with 15.5 g acetone.

The flask temperature was raised to 50° C., held for 30 minutes then followed by 44.57 g DMPA, then followed by 25.2 g TEA, was added to the flask via the addition funnel, which was then rinsed with 15.5 g acetone. The flask temperature was then raised again to 50° C. and held for 60 minutes.

With the temperature at 50° C., 1520.0 g deionized (DI) water was added over 10 minutes, followed by 131.00 g EDA (as a 6.25% solution in water) over 5 minutes, via the addition funnel, which was then rinsed with 80.0 g water. The mixture was held at 50° C. for 1 hr, then cooled to room temperature.

Acetone (−310.0 g) was removed under vacuum, leaving a final dispersoid of non-crosslinked polyurethane with about 35.0% solids by weight.

Comparative Polyurethane Dispersoid 2 (Comp. PUD 2)

To a dry alkali- and acid-free flask, equipped with an addition funnel, a condenser, stirrer and a nitrogen gas line, was added 540.80 g Desmophene C 200, 139.00 g acetone and 0.08 g DBTL. The contents were heated to 40° C. and mixed well. 180.20 g IPDI was then added to the flask via the addition funnel over 60 min, with any residual IPDI being rinsed from the addition funnel into the flask with 27.00 g acetone.

The flask temperature was raised to 50° C. and held for about 30 minutes (until the NCO %=5.2). 27.20 g DMPA followed by 17.4 g TEA was then added to the flask via the addition funnel, which was then rinsed with 5.00 g of acetone. The flask temperature was then held at 50° C. for about 60 minutes (until an NCO %=3.2 was achieved).

With temperature at 50° C., 797.0 g DI water was added over 10 minutes, followed by 259.00 g of a 6.25% solution of EDA in water, over 5 minutes, via the addition funnel, which was then rinsed with 3.00 g of water. The mixture was then held at 50° C. for 1 hr, then cooled to room temperature.

Acetone (−171.0 g) was removed under vacuum, leaving a final dispersoid of non-crosslinked polyurethane with about 40% solids by weight.

Polyurethane Dispersoid 1 (PUD EX 1)

To a dry, alkali- and acid-free flask, equipped with an addition funnel, a condenser, stirrer and a nitrogen gas line, was added 699.2 g Desmophene C 200, 280.0 g acetone and 0.06 g DBTL. The contents were heated to 40° C. and mixed well. 189.14 g IPDI was then added to the flask via the addition funnel at 40° C. over 60 min, with any residual IPDI being rinsed from the addition funnel into the flask with 15.5 g acetone.

The flask temperature was raised to 50° C. and held for 30 minutes. 44.57 g DMPA followed by 25.2 g TEA was then added to the flask via the addition funnel, which was then rinsed with 15.5 g acetone. The flask temperature was then raised again to 50° C. until NCO % was 1.14% or less.

With the temperature at 50° C., 1498.0 g deionized (DI) water was added over 10 minutes, followed by mixture of 97.5 g EDA (as a 6.25% solution in water) and 29.7 g TETA (as a 6.25% solution in water) over 5 minutes, via the addition funnel, which was then rinsed with 80.0 g water. The mixture was held at 50° C. for 1 hr, then cooled to room temperature.

Acetone (−310.0 g) was removed under vacuum, leaving a final dispersoid of polyurethane with about 35.0% solids by weight.

For polyurethane dispersoid 1, the crosslinking was achieved by the TETA.

Polyurethane Dispersoid 2 (PUD EX 2)

To a dry, alkali- and acid-free flask, equipped with an addition funnel, a condenser, stirrer and a nitrogen gas line, was added 699.2 g Desmophene C 200, 280.0 g acetone and 0.06 g DBTL. The contents were heated to 40° C. and mixed well. 189.14 g IPDI was then added to the flask via the addition funnel at 40° C. over 60 min, with any residual IPDI being rinsed from the addition funnel into the flask with 15.5 g acetone.

The flask temperature was raised to 50° C., then held for 30 minutes. 44.57 g DMPA followed by 25.2 g TEA was added to the flask via the addition funnel, which was then rinsed with 15.5 g acetone. The flask temperature was then raised again to 50° C. and held at 50° C. until NCO % was less than 1.23%.

With the temperature at 50° C., 1498.0 g deionized (DI) water was added over 10 minutes, followed by mixture of 24.4 g EDA (as a 6.25% solution in water) and 118.7 g TETA (as a 6.25% solution in water) over 5 minutes, via the addition funnel, which was then rinsed with 80.0 g water. The mixture was held at 50° C. for 1 hr, then cooled to room temperature.

Acetone (−310.0 g) was removed under vacuum, leaving a final dispersoid of polyurethane with about 35.0% solids by weight.

For polyurethane dispersoid 2 the crosslinking was achieved by the TETA.

Polyurethane Dispersoid 3 (PUD EX 3)

To a dry alkali- and acid-free flask, equipped with an addition funnel, a condenser, stirrer and a nitrogen gas line, was added 375.0 g Desmophene C200, 156.7 g acetone and 0.04 g DBTL. The contents were heated to 40° C. and mixed well. 107.5 g IPDI and 18.5 g Desmodur N3400 were then charged to the flask via the addition funnel over 60 min, with any residual isocyanate being rinsed from the addition funnel into the flask with 11.3 g acetone.

The flask temperature was raised to 50° C. and held for 30 minutes. 31.5 g DMPA followed by 20.2 g TEA was then added to the flask via the addition funnel, which was then rinsed with 7.4 g of acetone. The flask temperature was then held at 50° C. until the NCO % was less than 1.23%.

With temperature at 50° C., 850.0 g DI water was added over 10 minutes, followed by 100.0 g EDA (as a 6.25% solution in water) over 5 minutes, via the addition funnel, which was then rinsed with 50.0 g of water. The mixture was then held at 50° C. for 1 hr, then cooled to room temperature.

Acetone (−176.7 g) was removed under vacuum, leaving a final dispersoid of polyurethane with about 33% solids by weight.

For polyurethane dispersoid 3 the crosslinking was achieved by the polyfunctional isocyanate component of the Desmodur N3400.

Polyurethane Dispersoid 4 (PUD EX 4)

To a dry alkali- and acid-free flask, equipped with an addition funnel, a condenser, stirrer and a nitrogen gas line, was added 363.3 g Desmophene C 200, 115.4 g acetone and 0.04 g DBTL. The contents were heated to 40° C. and mixed well. 113.5 g IPDI was then charged to the flask via the addition funnel over 60 min, with any residual IPDI being rinsed from the addition funnel into the flask with 5.8 g acetone.

The flask temperature was raised to 50° C. and held for 30 minutes. 28.9 g DMPA followed by 19.6 g TEA was then added to the flask via the addition funnel, which was then rinsed with 4.0 g of acetone. The flask temperature was held at 50° C. until NCO % was less than 1.50%. Then 32.4 g Cythane® 3174 (Cytec) was charged and held at 50° C. for 5 minutes, followed by adding 600 g DI water over 10 minutes, and 120.0 g EDA (as a 6.25% solution in water) over 5 minutes, via the addition funnel, which was then rinsed with 40.0 g of water. The mixture was then held at 50° C. for 1 hr, then cooled to room temperature.

Acetone (~125.2 g) was removed under vacuum, leaving a final dispersoid of polyurethane with about 37% solids by weight.

For polyurethane dispersoid 4 the crosslinking was achieved by the polyfunctional isocyanate Cythane® 3174.

Polyurethane Dispersoid 5 (PUD EX 5)

To a dry, alkali- and acid-free flask, equipped with an addition funnel, a condenser, stirrer and a nitrogen gas line was added 327.64 g Terathane® 1400, 126.3 g acetone and 0.06 g DBTL. The contents were heated to 40° C. and mixed well. 115.36 g IPDI was then added to the flask via the addition funnel at 40° C. over 60 min, with any residual IPDI being rinsed from the addition funnel into the flask with 7.5 g acetone.

The flask temperature was raised to 50° C. and held for 30 minutes. 22.2 g DMPA followed by 12.6 g TEA was added to the flask via the addition funnel, which was then rinsed with 8.0 g acetone. The flask temperature was then raised again to 50° C. held at 50° C. until NCO % was less than 1.58%.

With the temperature at 50° C., 860.0 g deionized (DI) water was added over 10 minutes, followed 81.4 g TETA (as a 6.25% solution in water) over 5 minutes, via the addition funnel, which was then rinsed with 80.0 g water. The mixture was held at 50° C. for 1 hr, then cooled to room temperature.

Acetone (~141.8 g) was removed under vacuum, leaving a final dispersoid of polyurethane with about 30.0% solids by weight.

For polyurethane dispersoid 4, the crosslinking was achieved by the TETA.

Polyurethane Dispersoid 6 (PUD EX 6)

To a dry alkali- and acid-free flask, equipped with an addition funnel, a condenser, stirrer and a nitrogen gas line, was added 219.95 g Desmophene C 200, 44.10 g acetone and 0.007 g DBTL. The contents were heated to 40° C. and mixed well. 73.30 g IPDI was then added to the flask via the addition funnel over 60 min, with any residual IPDI being rinsed from the addition funnel into the flask with 10.90 g acetone.

The flask temperature was raised to 50° C. and held for 30-60 minutes (until the NCO %=5.0). 11.10 g DMPA followed by 8.88 g TEA was then added to the flask via the addition funnel, which was then rinsed with 4.17 g of acetone. The flask temperature was then held at 50° C. for about 60 minutes (until the NCO %=3.0), then cooled to 30° C. 30.40 g APTES was added over 50-60 minutes while controlling the exotherm to not higher than 45° C. The temperature was then raised to 50° C. until the NCO %=1.4%

With temperature at 50° C., 544.31 g DI water was added over 10 minutes, followed by 52.86 g of a 6.25% solution of EDA in water over 5 minutes, via the addition funnel. The mixture was then held at 50° C. for 1 hr, then cooled to room temperature.

Acetone (~59.17 g) was removed under vacuum, leaving a final dispersoid of polyurethane with about 36% solids by weight.

For polyurethane dispersoid 6, the crosslinking was achieved by the APTES.

Properties for Polyurethane Dispersoids 1-6 and Comparative Polyurethane Dispersoid 1

Polyurethane dispersoid physical properties and the THF insolubles were measured and reported in Table 1.

TABLE 1

| Polyurethane Dispersoid Properties | | | | | | | |
|---|---|---|---|---|---|---|---|
| | Comp PUD 1 | PUD EX 1 | PUD EX 2 | PUD EX 3 | PUD EX 4 | PUD EX 5 | PUD EX 6 |
| Viscosity (cps) | 45 | 66 | 20 | 50 | 268 | 184 | 36 |
| Solids % | 36.8 | 35.2 | 35.9 | 32.8 | 36.9 | 30 | 36 |
| pH | 7.5 | 7.48 | 7.59 | 7.50 | 7.5 | 8.45 | 8.42 |
| Particle Size (nm) | 60 | 65 | 64 | 62.5 | 42 | 41 | 85 |
| THF insolubles, % | 0 | 5 | 18.3 | 17.8 | 2.6 | 84 | 14.8 |

Polyurethane dispersoids 1-6 showed a range of THF insolubles indicating a range of crosslinking. The comparative example had no THF insolubles.

Polyurethane Dispersoid 7 (PUD EX 7)

To a dry, alkali- and acid-free flask, equipped with an addition funnel, a condenser, stirrer and a nitrogen gas line, was added 340 g Desmophene C 200, 9.8 g GP426, 140 g acetone and 0.04 g DBTL. The contents were heated to 40° C. and mixed well. 94.2 g IPDI was then added to the flask via the addition funnel at 40° C. over 60 min, with any residual IPDI being rinsed from the addition funnel into the flask with 7.7 g acetone.

The flask temperature was raised to 50° C. and held for 30 minutes. 22.3 g DMPA followed by 12.6 g TEA was added to the flask via the addition funnel, which was then rinsed with 7.7 g acetone. The flask temperature was then raised again to 50° C. and held for 60 minutes.

With the temperature at 50° C., 780 g deionized (DI) water was added over 10 minutes, followed by mixture of 13.0 g EDA (as a 6.25% solution in water) and 63.5 g TETA (as a 6.25% solution in water) over 5 minutes, via the addition funnel, which was then rinsed with 40 g water. The mixture was held at 50° C. for 1 hr, then cooled to room temperature.

Acetone (~155.4 g) was removed under vacuum, leaving a final dispersoid of polyurethane with about 34.0% solids by weight.

For polyurethane dispersoid 7, the crosslinking was achieved by the TETA.

Polyurethane Dispersoid 8 (PUD EX 8)

To a dry, alkali- and acid-free flask, equipped with an addition funnel, a condenser, stirrer and a nitrogen gas line, was added 90.0 g Desmophene C 200, 245.5 g Terathane® 1400,140 g acetone and 0.04 g DBTL. The contents were heated to 40° C. and mixed well. 108.3 g IPDI was then added to the flask via the addition funnel at 40° C. over 60 min, with any residual IPDI being rinsed from the addition funnel into the flask with 5.8 g acetone.

The flask temperature was raised to 50° C. and held for 30 minutes. 22.3 g DMPA followed by 12.6 g TEA was added to the flask via the addition funnel, which was then rinsed with 12.5 g acetone. The flask temperature was then raised again to 50° C. and held for 60 minutes.

With the temperature at 50° C., 787 g deionized (DI) water was added over 10 minutes, followed by 49 g TETA (as a 6.25% solution in water) over 5 minutes, via the addition funnel, which was then rinsed with 40 g water. The mixture was held at 50° C. for 1 hr, then cooled to room temperature.

Acetone (~157.3 g) was removed under vacuum, leaving a final dispersoid of polyurethane with about 34.0% solids by weight.

For polyurethane dispersoid 8, the crosslinking was achieved by the TETA.

Polyurethane Dispersoid 9 (PUD EX 9)

To a dry alkali- and acid-free flask, equipped with an addition funnel, a condenser, stirrer and a nitrogen gas line, was added 335.0 g of Desmophene C 200, 135 g acetone and 0.04 g DBTL. The contents were heated to 40° C. and mixed well. 82 g IPDI and 24.5 g Desmodur N3400 were then charged to the flask via the addition funnel over 60 min, with any residual isocyanate being rinsed from the addition funnel into the flask with 10.0 g acetone.

The flask temperature was raised to 50° C. and held for 30 minutes. 22.3 g DMPA followed by 13.1 g TEA was then added to the flask via the addition funnel, which was then rinsed with 10.0 g of acetone. The flask temperature was held at 50° C. until NCO % was 1.52 or less.

With temperature at 50° C., 730.0 g DI water was added over 10 minutes, followed by 96.0 g EDA (as a 6.25% solution in water) over 5 minutes, via the addition funnel, which was then rinsed with 40.0 g of water. The mixture was then held at 50° C. for 1 hr, then cooled to room temperature.

Acetone (~155 g) was removed under vacuum, leaving a final dispersoid of polyurethane with about 37% solids by weight.

For polyurethane dispersoid 9 the crosslinking was achieved by the polyfunctional isocyanate component of the Desmodur N3400.

Polyurethane Dispersoid 10 (PUD EX 10)

To a dry alkali- and acid-free flask, equipped with an addition funnel, a condenser, stirrer and a nitrogen gas line, was added 335.0 g of Desmophene C 200, 138 g acetone and 0.04 g DBTL. The contents were heated to 40° C. and mixed well. 90 g IPDI and 27.0 g Desmodur N3400 were then charged to the flask via the addition funnel over 60 min, with any residual isocyanate being rinsed from the addition funnel into the flask with 10.0 g acetone.

The flask temperature was raised to 50° C. and held for 30 minutes. 22.8 g DMPA followed by 13.3 g TEA was then added to the flask via the addition funnel, which was then rinsed with 10.0 g of acetone. The flask temperature was held at 50° C. until NCO % was 1.8% or less.

With temperature at 50° C., 716.0 g DI water was added over 10 minutes, followed by 134.0 g EDA (as a 6.25% solution in water) over 5 minutes, via the addition funnel, which was then rinsed with 40.0 g of water. The mixture was then held at 50° C. for 1 hr, then cooled to room temperature.

Acetone (~158 g) was removed under vacuum, leaving a final dispersoid of polyurethane with about 39% solids by weight.

For polyurethane dispersoid 10 the crosslinking was achieved by the polyfunctional isocyanate component of the Desmodur N3400.

Polyurethane Dispersoid 11 (PUD EX 11)

To a dry alkali- and acid-free flask, equipped with an addition funnel, a condenser, stirrer and a nitrogen gas line, was added 335.0 g of Desmophene C 200, 142 g acetone and 0.04 g DBTL. The contents were heated to 40° C. and mixed well. 99 g IPDI and 29.5 g Desmodur N3400 were then charged to the flask via the addition funnel over 60 min, with any residual isocyanate being rinsed from the addition funnel into the flask with 10.0 acetone.

The flask temperature was raised to 50° C. and held for 30 minutes. 23.4 g DMPA followed by 13.6 g TEA was then added to the flask via the addition funnel, which was then rinsed with 10.0 g of acetone. The flask temperature was held at 50° C. until NCO % was 2.3% or less.

With temperature at 50° C., 700.0 g DI water was added over 10 minutes, followed by 174.0 g EDA (as a 6.25% solution in water) over 5 minutes, via the addition funnel, which was then rinsed with 40.0 g of water. The mixture was then held at 50° C. for 1 hr, then cooled to room temperature.

Acetone (~162 g) was removed under vacuum, leaving a final dispersoid of polyurethane with about 36% solids by weight.

For polyurethane dispersoid 11 the crosslinking was achieved by the polyfunctional isocyanate component of the Desmodur N3400.

Polyurethane Dispersoid 12 (PUD EX 12)

To a dry alkali- and acid-free flask, equipped with an addition funnel, a condenser, stirrer and a nitrogen gas line, was added 349.5 g of Desmophene C 200, 140 g acetone and 0.04 g DBTL. The contents were heated to 40° C. and mixed well. 87 g IPDI and 16 g Desmodur N3400 were then charged to the flask via the addition funnel over 60 min, with any residual isocyanate being rinsed from the addition funnel into the flask with 10.0 g acetone.

The flask temperature was raised to 50° C. and held for 30 minutes. 22.3 g DMPA followed by 12.8 g TEA was then added to the flask via the addition funnel, which was then rinsed with 10.0 g of acetone. The flask temperature was held at 50° C. until NCO % was 1.23% or less.

With temperature at 50° C., 730.0 g DI water was added over 10 minutes, followed by 159.6 g IPDA (as a 10.0% solution in water) over 5 minutes, via the addition funnel, which was then rinsed with 40.0 g of water. The mixture was then held at 50° C. for 1 hr, then cooled to room temperature.

Acetone (~160 g) was removed under vacuum, leaving a final dispersoid of polyurethane with about 35% solids by weight.

For polyurethane dispersoid 12 the crosslinking was achieved by the polyfunctional isocyanate component of the Desmodur N3400.

Polyurethane Dispersoid 13 (PUD EX 13)

To a dry alkali- and acid-free flask, equipped with an addition funnel, a condenser, stirrer and a nitrogen gas line, was added 350.0 g of Desmophene C 200, 140 g acetone and 0.04 g DBTL. The contents were heated to 40° C. and mixed well. 87 g IPDI and 16 g Desmodur N3400 were then charged to the flask via the addition funnel over 60 min, with any residual isocyanate being rinsed from the addition funnel into the flask with 10.0 g acetone.

The flask temperature was raised to 50° C. and held for 30 minutes. 22.3 g DMPA followed by 12.8 g TEA was then added to the flask via the addition funnel, which was then rinsed with 10.0 g of acetone. The flask temperature was held at 50° C. until NCO % was 1.23% or less.

With temperature at 50° C., 770.0 g DI water was added over 10 minutes, followed by 109.25 g CHBMA (as a 12.00% solution in water) over 5 minutes, via the addition funnel, which was then rinsed with 40.0 g of water. The mixture was then held at 50° C. for 1 hr, then cooled to room temperature.

Acetone (~160 g) was removed under vacuum, leaving a final dispersoid of polyurethane with about 35% solids by weight.

For polyurethane dispersoid 13 the crosslinking was achieved by the polyfunctional isocyanate component of the Desmodur N3400.

Polyurethane Dispersoid 14 (PUD EX 14)

Polyurethane dispersoid 14 was a physical blend of polyurethane dispersoids from Comparative Example 1 and PUD Ex 6. The material was a 50:50 by weight blend.

Properties for Polyurethane Dispersoids 7-14

Polyurethane dispersoid physical properties and the THF insolubles were measured and reported in Table 2.

TABLE 2

Properties for Polyurethane Dispersoids 7-14

| | PUD EX 7 | PUD EX 8 | PUD EX 9 | PUD EX 10 | PUD EX 11 | PUD EX 12 | PUD EX 13 | PUD EX 14 |
|---|---|---|---|---|---|---|---|---|
| Viscosity (cps) | 26 | 414 | 486 | 320 | 24 | 60 | 26.5 | 18 |
| Solid % | 34% | 34% | 37% | 39% | 36% | 35% | 35% | 36 |
| PH | 7.50 | 7.50 | 8.05 | 8.4 | 8.4 | 7.83 | 7.81 | 7.50 |
| Particle Size (nm) | 71 | 41 | 62 | 94 | 85 | 66 | 59 | NA |
| THF insolubles | 14.7% | 8% | 14% | 31% | 39% | NA | NA | NA |

Set 1: Tests of Crosslinked Polyurethane Dispersoids

The composition for Ink Examples A-F and Comparative Ink A are listed in Table 3. The preparation of the black dispersion was described previously.

TABLE 3

Composition of Ink Examples

| | Comp. Ink A | A | B | C | D | E | F |
|---|---|---|---|---|---|---|---|
| Black dispersion (% pigment) | 4.25% | 4.25% | 3.43% | 4.25% | 4.12% | 4.25% | 4.25% |
| Comp PUD 1 | 10% | | | | | — | — |
| PUD EX 1 | | 11% | | | | | |
| PUD EX 2 | — | | 13.09% | | | | — |
| PUD EX 3 | — | | | 10% | | | |
| PUD EX 4 | | | | | 11% | | |
| PUD EX 5 | | | | | | 10% | |
| PUD EX 6 | | | | | | | 10% |
| Dipropylene Glycol Methyl Ether | 3% | 3% | 2.37% | 3% | 2.91% | 3% | 3% |
| Glycerol | 6.5% | 8% | 14.23% | 9.0% | 7.76% | 7% | 8% |
| Ethylene Glycol | 9.5% | 11% | 9.49% | 11% | 10.67% | 10% | 11% |
| Liponic ™ EG-1 | 3.5% | | | | | 4% | 5% |
| Surfynol ® 104E | 0.2% | 0.2% | 0.16% | 0.2% | 0.19% | 0.2% | 0.2% |
| Silwet ® L77 | 0.2% | 0.2% | 0.16% | 0.2% | 0.19% | 0.2% | 0.2% |
| Water (to 100%) | Bal. | Bal. | Bal. | Bal. | Bal. | Bal. | Bal. |
| Viscosity (cps) | 6.3 | 7.94 | 7.98 | 10.00 | 7.84 | 8.3 | 7.7 |

The inks were then printed onto a 419 Cotton test fabric. The printing apparatus is described above as ink printer (1). After printing the textile was removed and fused with a platen press at 160° C., 10 psig and a dwell time of 1 minute.

After printing and fusing, the fabrics were tested according to the 'Colorfastness' AATCC Test Method 61-1996 as described above.

Unless otherwise noted, all of the fabric testing described herein was performed on are textiles printed, fused and tested in this manner.

TABLE 4

Wash and stain results

| | Comp. Ink A | A | B | C | D | E | F |
|---|---|---|---|---|---|---|---|
| 2A wash rating | 1.5 | 3.31 | 3.01 | 4.0 | 3.5 | 3.5 | 3.0 |
| 3A wash rating | 0.5 | 2.64 | 2.85 | 4.0 | | 2.5 | 2.0 |
| 2A stain rating | 2.31 | 4.36 | 4.78 | | | | |
| 3A stain rating | | 3.31 | 4.57 | 4.0 | | | |

The washfastness and stain ratings show that the crosslinked polyurethane dispersoid containing ink formulations A-F (in accordance with the invention) significantly improve washfastness and stain rating relative to the comparative example.

Set 2: Crosslinked Polyurethane Dispersoids with Different Colors

Inks were prepared according to the recipes listed in Table 6. For the inks, the pigments and dispersion are listed in Table 5. Table 7 lists the washfastness and stain rating results for these colored inks.

TABLE 5

Colored Inks, Pigment Types and Polymeric Dispersants

| Color | Pigment type | Polymeric Dispersant |
|---|---|---|
| Yellow | PY 14 | BzMA//MAA/ETEGMA (13//13/7.5) |
| Magenta | PR 122 | BzMA//MAA/ETEGMA (13//13/7.5) |
| Cyan | PB 153 | BzMA//MAA (13//10) |
| Blue | PB 60 | BzMA//MAA/ETEGMA (13//13/7.5) |
| Orange | PO 34 | BzMA//MAA/ETEGMA (13//13/7.5) |

Notes:

BzMA//MAA(13//10) was prepared using the procedure "Preparation of Dispersant 2" from previously incorporated US20030128246.

BzMA//MAA/ETEGMA (13//13/7.5) was prepared using the procedure "Preparation of Dispersant 3" from previously incorporated US20030128246.

TABLE 6

Ink compositions of other ink with different colors and viscosity data

| | Yellow | | Magenta | | Cyan | | Blue | | Orange | |
|---|---|---|---|---|---|---|---|---|---|---|
| | \multicolumn{10}{c}{Ink Example} | | | | | | | | | |
| | G | H | I | J | K | L | M | N | O | P |
| Dispersion (pigment %) | 4.25% | 4.25% | 4.25% | 4.25% | 3.0% | 3.0% | 3.0% | 3.0% | 4.25% | 4.25% |
| PUD EX1 | 5.7% | | 6.4% | | 6.0% | | 10.3% | | 6.9% | |
| PUD EX2 | | 8.0% | | 8.7% | | 6.0% | | 13.9% | | 9.4% |
| Propylene Glycol Methyl Ether | 10% | 10% | 10.0% | 10.0% | 5.0% | 5.0% | 5.0% | 5.0% | 10% | 10% |
| Glycerol | 8.83% | 8.83% | 5.0% | 5.0% | 18.7% | 19.3% | 14.0% | 14.0% | 5.0% | 5.0% |
| Ethylene Glycol | | | 5.0% | 5.0% | | | | | | |
| Liponic ™ EG-1 | 5.0% | 5.0% | 5.0% | 5.0% | 6.0% | 6.0% | 5.0% | 5.0% | 5.0% | 5.0% |
| Surfynol ® 104E | | | 0.17% | 0.17% | 0.2% | 0.25 | 0.2% | 0.2% | | |
| Surfynol ® 485E | | | 0.33% | 0.33% | | | | | | |
| Surfynol ® 440 | 1.0% | 1.0% | | | | | | | 0.5% | 0.5% |
| Water (to 100%) | Balance | Balance | Balance | Balance | Balance | Balance | Balance | Balance | Balance | Balance |
| Viscosity (cps) | 8.14 | 8.32 | 7.7 | 8.1 | NA | NA | NA | NA | NA | NA |

TABLE 7

Washfastness Results of Different Colors

| | \multicolumn{10}{c}{Color} | | | | | | | | | |
|---|---|---|---|---|---|---|---|---|---|---|
| | Yellow | | Magenta | | Cyan | | Blue | | Orange | |
| | \multicolumn{10}{c}{Ink Example} | | | | | | | | | |
| Wash test | G | H | I | J | K | L | M | N | O | P |
| 2A Wash Rating | 4.23 | 4.19 | 3.60 | 3.91 | 3.32 | 3.72 | 3.24 | 3.62 | 3.30 | 3.55 |
| 3A Wash Rating | 3.65 | 3.70 | 3.00 | 3.27 | 3.00 | 3.31 | 2.51 | 2.98 | 2.62 | 2.84 |
| 2A Stain Rating | 4.36 | 4.84 | 4.43 | 4.73 | 4.26 | 4.72 | | | | |
| 3A Stain Rating | 2.68 | 4.48 | 2.53 | 4.42 | 2.64 | 4.09 | | | | |

Washfastness and stain rating vary with different ink colors.

Set 3: Evaluation of Crosslinked Polyurethane Dispersoid Preparation Differences and Fusing Changes A third set inks was prepared and tested for differences in polyurethane preparation (polyurethane dispersoids 7 and 9-14) and fusion conditions. The ink compositions Q-W with black pigment are shown in Table 8, and a summary of test results is shown in Table 9.

TABLE 8

Ink Compositions for Polyurethane Dispersoids 7 and 9-14

| | \multicolumn{7}{c}{Ink Example} | | | | | | |
|---|---|---|---|---|---|---|---|
| | Q | R | S | T | U | V | W |
| Black dispersion (% pigment) | 4.25% | 4.25% | 4.25% | 4.25 | 4.25% | 4.25 | 4.25% |
| PUD EX 7 | 13% | | | | | | |
| PUD EX 9 | | 13% | | | | | |
| PUD EX 10 | | | 13% | | | | |
| PUD EX 11 | | | | 13% | | | |
| PUD EX 12 | | | | | 13% | | |
| PUD EX 13 | | | | | | 13% | |
| PUD EX 14 | | | | | | | 13% |
| Glycerol | 11.5% | 10% | 12% | 14% | 12% | 12% | 11.5% |
| Ethylene Glycol | 12% | 12% | 12% | 12% | 12% | 12% | 12% |
| Surfynol ® 104E | 0.15% | 0.15% | 0.15% | 0.15% | 0.15% | 0.15% | 0.15% |
| Silwet ® L77 | 0.15% | 0.15% | 0.15% | 0.15% | 0.15% | 0.15% | 0.15% |
| Water (to 100%) | Bal. | Bal. | Bal. | Bal. | Bal. | Bal. | Bal. |
| Viscosity (cps) | 7.56 | 8.33 | 7.94 | 7.56 | 7.78 | 7.39 | 7.44 |

TABLE 9

Washfastness Results

| | Ink Example | | | | | |
|---|---|---|---|---|---|---|
| | Q | R | S | T | U | V | W |
| 2A wash rating | 2.7 | 3.2 | 4.0 | 3.7 | 2.8 | 3.1 | 1.37 |
| 3A wash rating | 1.7 | 2.6 | 3.1 | 3.8 | 2.2 | 2.1 | 0.46 |
| 2A stain rating | 4.72 | 4.6 | 4.8 | 4.7 | 4.4 | 4.4 | 4.64 |
| 3A stain rating | 2.75 | 3.7 | 4.2 | 3.2 | 2.0 | 2.1 | 3.08 |

Ink W, which was prepared from the polyurethane dispersoid 50/50 wt % blend described in PUD EX 14 (physical mixture of crosslinked polyurethane dispersoid with a non-crosslinked polyurethane dispersoid), resulted in lower wash ratings (but comparable stain ratings) when compared to a crosslinked polyurethane only.

Set 4: Washfastness at Different Fusing Temperatures

A black ink prepared according to the recipe described above for Ink B, and using a polyurethane made according to the recipe for Example PUD EX 2, was printed on 419 cotton and the printed textile was fused at different temperatures. The results are shown in the Table 11.

TABLE 11

Washfastness at Different Fusing Temperatures. Ink Example Y Washfastness, 419 cotton:

| Temp | 2A | 3A |
|---|---|---|
| 160° C. | 3.09 | 2.01 |
| 180° C. | 4.43 | 3.09 |
| 200° C. | 3.59 | 1.5 |

Washfastness is improved with higher temperatures with 419 cotton and this ink formulation.

Set 5: Wash Fastness at Higher Temperatures

Magenta ink prepared according to the recipe Ink I, and using a polyurethane made according to the recipe for PUD EX 2, was printed on 419 cotton and the printed textile was fused at different temperatures. After the textile was treated at the indicated temperature, it was exposed with the platen press fuser at 10 psig and for 1 minute dwell time. The results of these experiments are shown on Table 12.

TABLE 12

Washfastness at Different Fusing Temperatures. Ink Example Z

| | No Fusing | 160° C. | 170° C. | 180° C. | 190° C. | 200° C. |
|---|---|---|---|---|---|---|
| 2A washfastness | 1.5 | 3.1 | 3.6 | 4.4 | 4.4 | 4.1 |
| 3A Washfastness | 0.5 | 2.2 | 2.5 | 3.2 | 3.5 | 3.4 |

For this set of tests, the washfastness improved with fusing and at higher temperatures.

Set 6: Washfastness Tested on Different Fabrics

A black ink prepared according to recipe described above for Ink B, and using a polyurethane made according to the recipe for PUD EX 2, was used to print 419 cotton, 7435 poly/cotton blend and 755 polyester test samples. The printing was done using with ink printer (1) and the textiles were fused at 160° C., 10 psig platen pressure and with a dwell time of one minute. The washfastness and crock were tested for these samples. Crock test procedures are described in the AATCC Test Method mentioned above.

TABLE 13

Washfastness on different fabrics: Ink Example R

| | 2A wash | 3A wash | 2A stain | 3A stain | Dry crock | Wet crock |
|---|---|---|---|---|---|---|
| 419 cotton | 3.5 | 2.6 | 4.3 | 1.9 | 4.7 | 2.6 |
| 7435 Poly/cotton blend | 2.1 | 1.5 | 3.8 | 1.8 | 4.9 | 2.3 |
| 755 polyester | 2.1 | 1.5 | 3.5 | 1.6 | 4.7 | 2.6 |

Set 7: Polyurethane Dispersoids with Different NCO/OH Ratios

Polyurethane dispersoids were prepared by methods using the recipes listed above for PUD EX 9 (1.27 ratio of NCO/OH), PUD EX 10 (1.4 ratio of NCO/OH) and PUD EX 11 (1.5 NCO/OH ratio). As indicated, three different NCO/OH ratios were tested. The inks listed in Table 8 were used to print cotton samples, which were tested for washfastness. Table 14 shows the results.

TABLE 14

Variation in polyurethane NCO/OH ratios

| NCO/OH // | | 419 cotton | | 7435 poly/cotton blend | |
|---|---|---|---|---|---|
| Ink Example | THF insoluble | 2A | 3A | 2A | 3A |
| 1.27// R | 4% | 3.2 | 2.6 | 2.1 | 1.9 |
| 1.4// S | 31% | 4 | 3.1 | 2.3 | 1.9 |
| 1.5// T | 38% | 3.7 | 3.8 | 2.6 | 2 |

Higher NCO/OH gave improved washfastness, especially on cotton. The amount of THF insolubles also increased with increasing NCO/OH ratio over the range tested.

Set 8: Polyurethane Dispersoids with Different Chain Extenders.

Polyurethane dispersoids were prepared with three different chain extenders according to PUD Ex 3 (EDA), PUD Ex 12 (IPDA) and PUD Ex 13 (CHBMA). The dispersoids were used in inks are listed in Tables 3 and 8, and cotton samples were printed and tested for washfastness.

TABLE 15

Polyurethane dispersoids with different chain extenders

| Chain extender/ | 419 cotton | | 7435 poly/cotton blend | |
|---|---|---|---|---|
| Ink Example | 2A | 3A | 2A | 3A |
| EDA/C | 3.7 | 2.9 | 2 | 1.7 |
| IPDA/U | 2.8 | 2.2 | 1.9 | 1.5 |
| CHBMA/V | 3.1 | 2.1 | 1.2 | 1.7 |

Based on these tests, the EDA results in the best washfastness.

Set 9: Polyurethane Dispersoids with Different Neutralization

Polyurethane dispersoids were prepared with two different neutralizing agents by the methods shown in PUD EX 3. For PUD Ex 3, the neutralizing agent was triethylamine (TEA). For the alternative neutralizing agent, a molar equivalent of DMIPA was used. For the DMIPA neutralizer, the same ink formulation is used as Ink C. The dispersoids were used in ink, cotton printed and tested for washfastness.

TABLE 16

Polyurethane Dispersoid with Different Neutralizing Agents

| Neutralizer/ | 419 cotton | | 7435 poly/ cotton blend | |
|---|---|---|---|---|
| Ink Example | 2A | 3A | 2A | 3A |
| TEA/C | 3.7 | 2.9 | 2 | 1.7 |
| DMIPA/AA | 4.5 | 2.4 | 2.1 | 1.2 |

No different washfastness was determined for the two neutralizing agents. The printability of the DMIPA was not as good as the TEA.

Set 10: Washfastness for Different Polyurethane Dispersoids

Three different polyurethane dispersoids were prepared. Entry a is prepared by the same process as PUD EX 6. Entry b and Entry c (Table 17) were prepared by the same process as described in Example 2. The dispersoids were used to prepare inkjet inks, printed on cotton, fused at different temperatures and tested for washfastness.

TABLE 17

Test of Different Polyurethane Dispersoids and Different Temperatures

| Prep of PUD dispersoid/ procedure listed above.//Ink Example | THF insolubles | Wash test | 160° C. | 170° C. | 180° C. | 190° C. | 200° C. |
|---|---|---|---|---|---|---|---|
| a. similar to example 6//AB | 84% | 2A | 2 | 3 | 3 | 4 | 4.5 |
|  |  | 3A | 1.5 | 2 | 2 | 2.5 |  |
| b. similar to Example 2//AC | 40% | 2A | 3.5 | 4 | 4.5 | 4.5 | 4.5 |
|  |  | 3A | 2.5 | 2.5 | 3 | 3.5 | 3.5 |
| c. similar to Example 2//AD (Footnote 1) | 4.5% (9.3%) | 2A | 4 | 4.5 | 4.5 | 4.5 | 4 |
|  |  | 3A | 2.5 | 3.5 | 3 | 3 | 3 |

1) This preparation was performed at a large scale, about 50 times larger than Example a. The temperature of the water for inversion was ambient, not heated as in example b and the TETA source was Akzo Chemical.

Different polyurethane dispersoid preparations resulted in similar washfastness performance; washfastness improved with higher temperature treatment. With higher crosslink density, higher fusing temperatures were needed to achieve better washfastness.

Set 11: Ink Stability

Inks of the instant invention generally are storage stable. Thus, the instant inks can sustain elevated temperature in a closed container for extended periods (e.g. 70° C. for 7 days) without substantial increase in viscosity or particle size.

Ink Example B was heated at 70° C. for 7 days and physical properties were measured.

TABLE 18

Storage stability

|  | Before aging | After aging |
|---|---|---|
| Viscosity | 7.98 | 7.52 |
| pH | 7.81 | 7.81 |
| Particle size D50 (nm) | 66 | 68 |
| <202.4 nm | 100% | 97.5% |

This ink was judged to be stable.

The invention claimed is:

1. An inkjet ink composition comprising an aqueous vehicle, a colorant and a crosslinked polyurethane dispersoid binder, wherein the weight ratio of crosslinked polyurethane dispersoid binder to colorant is at least about 1.0, and wherein the colorant is a pigment and wherein the crosslinking in the crosslinked polyurethane binder is greater than about 1 weight % and less than about 50 weight % as measured by the THF insoluble test,
   wherein the crosslinking of the crosslinked polyurethane dispersoid binder is substantially completed before said binder is combined with other inkjet ink components to prepare the aqueous inkjet composition.

2. The inkjet ink composition of claim 1, wherein the ink comprises from about 0.1 to about 30% by weight of the colorant, based on the total weight of the ink.

3. The inkjet ink composition of claim 1, wherein the ink comprises more than about 1% to about 30% by weight of the crosslinked polyurethane dispersoid binder, based on the total weight of the ink.

4. The inkjet ink composition of claim 1, wherein the ink comprises from about 0.1 to about 30% by weight of the colorant, and more than about 1% to about 30% by weight of the crosslinked polyurethane dispersoid binder, based on the total weight of the ink; and the crosslinking in the crosslinked polyurethane is greater than about 1% and less than about 50% as measured by a THF insolubles test.

5. The inkjet ink composition of claim 1, having a surface tension in the range of about 20 dyne/cm to about 70 dyne/cm, and a viscosity is in the range of about 1 cP to about 30 cP at 25° C.

6. The inkjet ink composition of claim 1, wherein the crosslinked polyurethane binder has incorporated therein hydrophilic functionality to the extent required to maintain a stable dispersion of the polymer in the aqueous vehicle.

7. An inkjet ink set comprising at least three differently colored inkjet inks, wherein at least one of the inks is an inkjet ink composition comprising an aqueous vehicle, a colorant and a crosslinked polyurethane dispersoid binder, wherein the weight ratio of crosslinked polyurethane to colorant is at least about 1.0 and the crosslinking in the crosslinked polyurethane dispersoid binder is greater than about 1 weight % and less than about 50 weight % as measured by a THF insoluble test, and wherein the colorant is a pigment and wherein the crosslinking of the crosslinked polyurethane dispersoid binder is substantially completed before said binder is combined with other inkjet ink components to prepare the aqueous inkjet composition.

8. The inkjet ink set of claim 7, wherein the inkjet ink composition comprises from about 0.1 to about 30% by weight of the colorant, and more than about 1% to about 30% by weight of the crosslinked polyurethane dispersoid binder, based on the total weight of the ink; and the crosslinking in the crosslinked polyurethane dispersoid binder is greater than about 1% and less than about 50 weight % as measured by a THF insoluble test.

9. The inkjet ink set of claim 8, wherein the inkjet ink composition has a surface tension in the range of about 20 dyne/cm to about 70 dyne/cm, and a viscosity is in the range of about 1 cP to about 30 cP at 25° C.

10. The inkjet ink set of claim 7, wherein the crosslinked polyurethane dispersoid binder has incorporated therein hydrophilic functionality to the extent required to maintain a stable dispersion of the polymer in the aqueous vehicle.

11. The inkjet ink set of claim 7, wherein ink set comprises:
   (a) a first colored ink comprising a first aqueous vehicle, a first colorant and a first crosslinked polyurethane dispersoid binder, wherein the weight ratio of the second polyurethane dispersoid binder to second colorant is at least about 1.0, and wherein the colorant is a pigment;
   (b) a second colored ink comprising a second aqueous vehicle, a second colorant and a second crosslinked polyurethane dispersoid binder, wherein the second colorant is soluble or dispersible in the second aqueous vehicle, and wherein the weight ratio of the second polyurethane dispersoid to second colorant is at least about 1.0; and
   (c) a third colored ink comprising a third aqueous vehicle, a third colorant and a third crosslinked polyurethane dispersoid binder, wherein the weight ratio of the third polyurethane dispersoid binder to third colorant is at least about 1.0, and wherein the colorant is a pigment.

12. The inkjet ink set of claim 11, wherein the first colored ink is a cyan ink, the second colored ink is a magenta ink and the third colored ink is a yellow ink.

13. The inkjet ink set of claim 11, further comprising (d) a fourth colored ink comprising a fourth aqueous vehicle, a fourth colorant and a fourth crosslinked polyurethane dispersoid binder, wherein the weight ratio of the fourth polyurethane dispersoid binder to fourth colorant is at least about 1.0, and wherein the colorant is a pigment.

14. The inkjet ink set of claim 13, wherein the fourth colored ink is a black ink.

15. A method for inkjet printing onto a substrate, comprising the steps of:
   (a) providing an inkjet printer that is responsive to digital data signals;
   (b) loading the printer with a substrate to be printed;
   (c) loading the printer with an inkjet ink composition comprising an aqueous vehicle, a colorant and a crosslinked polyurethane dispersoid binder, wherein the colorant is a pigment, and wherein the weight ratio of crosslinked polyurethane binder to pigment is at least about 1.0; the crosslinking in the crosslinked polyurethane dispersoid binder is greater than about 1 weight % and less than about 50 weight % as measured by the THF insoluble test and said crosslinking is substantially completed before said binder is combined with other inkjet ink components; and
   (d) printing onto the substrate using the ink in response to the digital data signals.

16. The method of claim 15, wherein the printer is loaded with an inkjet ink set comprising at least three differently colored inkjet inks, wherein at least one of the inks is an inkjet ink composition comprising an aqueous vehicle, a colorant and a crosslinked polyurethane dispersoid binder, wherein the weight ratio of crosslinked polyurethane dispersoid binder to colorant is at least about 1.0; wherein the crosslinking of the crosslinked polyurethane dispersoid binder is substantially completed before said binder is combined with other inkjet ink components; wherein the colorant is a pigment and wherein the printing onto the substrate uses the inkjet ink set.

17. The method of claim 15, wherein the substrate is a textile.

18. The method of claim 17, wherein the printed substrate is post treated with a combination of heat and pressure.

19. The method of claim 17, wherein the printed textile has a wash fastness of at least 2.0 and a stain rating of at least 3.3 (as measured in accordance with AATCC Test Method 61-1996 as the 2A test).

20. An inkjet printed textile inkjet printed with a pigmented inkjet ink composition, said composition comprising an aqueous vehicle, a colorant and a crosslinked polyurethane dispersoid binder, wherein the weight ratio of crosslinked polyurethane dispersoid binder to colorant is at least about 1.0, and wherein the colorant is a pigment and wherein the crosslinking in the crosslinked polyurethane binder is greater than about 1 weight % and less than about 50 weight % as measured by the THF insoluble test and said crosslinking is substantially completed before said binder is combined with other inkjet ink components, and said printed textile having a wash fastness of at least 2.0 and a stain rating of at least 3.0 (as measured in accordance with AATCC Test Method 61-1996 as the 2A test).

21. The inkjet ink composition of claim 1 wherein the pigment is a disperse dye.

22. The inkjet ink set of claim 7 wherein the pigment is a disperse dye.

\* \* \* \* \*